US012094287B2

(12) United States Patent
Kuhlmann et al.

(10) Patent No.: US 12,094,287 B2
(45) **Date of Patent: *Sep. 17, 2024**

(54) GAMING MACHINE, CONTROL METHOD FOR MACHINE, AND PROGRAM FOR GAMING MACHINE

(71) Applicant: Konami Gaming, Inc., Las Vegas, NV (US)

(72) Inventors: Michael Kuhlmann, Henderson, NV (US); Benjamin Merkel, Las Vegas, NV (US); John Pariseau, Las Vegas, NV (US); Satoshi Suda, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,496

(22) Filed: May 4, 2023

(65) Prior Publication Data

US 2023/0386287 A1 Nov. 30, 2023

Related U.S. Application Data

(63) Continuation of application No. 17/525,515, filed on Nov. 12, 2021, now Pat. No. 11,688,230, which is a (Continued)

(51) Int. Cl.
*G07F 17/32* (2006.01)
*G07F 17/34* (2006.01)

(52) U.S. Cl.
CPC ...... *G07F 17/3213* (2013.01); *G07F 17/3227* (2013.01); *G07F 17/34* (2013.01)

(58) Field of Classification Search
CPC ... G07F 17/3213; G07F 17/3227; G07F 17/34
See application file for complete search history.

(56) References Cited

U.S. PATENT DOCUMENTS

| | | | |
|---|---|---|---|
| 6,186,894 | B1 | 2/2001 | Mayeroff |
| 6,270,411 | B1 | 8/2001 | Gura et al. |

(Continued)

FOREIGN PATENT DOCUMENTS

| | | | |
|---|---|---|---|
| JP | 2008-36401 | A | 2/2008 |
| JP | 2009-207845 | A | 9/2009 |

(Continued)

*Primary Examiner* — Kevin Y Kim
(74) *Attorney, Agent, or Firm* — Howard & Howard Attorneys PLLC

(57) ABSTRACT

A gaming machine is described herein. The gaming machine includes a control unit operably coupled to the control panel and the display device. The control unit including a processor programmed to execute an algorithm to display an animated sequence of computer-generated images on the display device including the steps of displaying a game screen on the display device including a plurality of reels, establishing a plurality of predefined subsets of cells, displaying a plurality of player selectable feature area buttons on a touchscreen with each player selectable feature area associated with a corresponding subset of cells, receiving a player's selection of a selected player selectable feature area button and highlighting a feature area including the corresponding subset of cells, animating the plurality of reels to spin and stop and displaying a game feature upon detecting the occurrence of a predetermined symbol appearing in the highlighted feature area.

20 Claims, 41 Drawing Sheets

Related U.S. Application Data continuation of application No. 15/945,067, filed on Apr. 4, 2018, now Pat. No. 11,205,317, which is a continuation-in-part of application No. 15/479,112, filed on Apr. 4, 2017, now Pat. No. 10,510,205.

(56) References Cited

U.S. PATENT DOCUMENTS

| | | | |
|---|---|---|---|
| 6,612,927 | B1 | 9/2003 | Slomiany et al. |
| 6,960,133 | B1 | 11/2005 | Marks et al. |
| 7,361,089 | B2 | 4/2008 | Daly et al. |
| 2002/0045474 | A1 | 4/2002 | Singer et al. |
| 2003/0060272 | A1 | 3/2003 | Glavich et al. |
| 2003/0216165 | A1 | 11/2003 | Singer et al. |
| 2006/0287036 | A1 | 12/2006 | Daly et al. |
| 2006/0287042 | A1 | 12/2006 | Osawa |
| 2007/0026933 | A1 | 2/2007 | Tanimura |
| 2007/0129135 | A1 | 6/2007 | Marks et al. |
| 2007/0287523 | A1 | 12/2007 | Esses et al. |
| 2008/0234033 | A1 | 9/2008 | Berman et al. |
| 2009/0239643 | A1 | 9/2009 | Kato |
| 2009/0247262 | A1 | 10/2009 | Kato |
| 2009/0247272 | A1 | 10/2009 | Abe |
| 2009/0275385 | A1 | 11/2009 | Yadav |
| 2009/0305770 | A1 | 12/2009 | Bennett et al. |
| 2009/0325667 | A1 | 12/2009 | Weber |
| 2010/0069140 | A1 | 3/2010 | Yoshizawa |
| 2012/0115570 | A1 | 5/2012 | Collette et al. |
| 2012/0122542 | A1 | 5/2012 | Montenegro et al. |
| 2012/0270633 | A1 | 10/2012 | Jackson |
| 2013/0072282 | A1 | 3/2013 | Nicely |
| 2014/0162751 | A1 | 6/2014 | Ryan |
| 2014/0256402 | A1 | 9/2014 | Caputo et al. |
| 2015/0235510 | A1 | 8/2015 | Meyer |
| 2016/0049038 | A1 | 2/2016 | Nakamura |
| 2016/0093153 | A1 | 3/2016 | Hawkins et al. |
| 2018/0075708 | A1 | 3/2018 | San |
| 2018/0286175 | A1 | 10/2018 | Kuhlmann et al. |

FOREIGN PATENT DOCUMENTS

| | | | |
|---|---|---|---|
| JP | 2016-10605 | A | 1/2016 |
| JP | 2016-34403 | A | 3/2016 |
| WO | 2014/133454 | A1 | 9/2014 |

132

260

262

264

| | R1 | R2 | R3 | R4 | R5 |
|---|---|---|---|---|---|
| 1 | PicB | Wild | PicB | PicD | Prize |
| 2 | Q | Prize Wheel | Prize | 10 | PicE |
| 3 | K | Wild | J | Q | 10 |
| 4 | PicB | Prize | Q | PicA | Prize |
| 5 | PicA | 9 | PicD | PicE | Prize |
| 6 | PicD | J | Prize Wheel | Q | Prize |
| 7 | K | PicA | J | A | 10 |
| 8 | PicA | PicC | Q | Wild | 9 |
| 9 | 9 | PicD | PicA | Prize | Wild |
| 10 | Prize | PicB | Prize | Prize | Wild |
| 11 | J | Prize | Prize | Prize | PicC |
| 12 | PicC | Prize | Prize | inn | Prize |
| 13 | Prize | Prize | A | inn | Prize |
| 14 | Prize | inn | J | inn | Prize |
| 15 | Prize | inn | inn | inn | inn |
| 16 | A | inn | inn | inn | inn |
| 17 | Q | inn | inn | J | inn |
| 18 | PicE | inn | Wild | Prize Wheel | inn |
| 19 | J | A | Wild | PicC | inn |
| 20 | inn | PicE | Wild | A | PicA |

FIG. 13A

132

260

262

264

| | R1 | R2 | R3 | R4 | R5 |
|---|---|---|---|---|---|
| 1 | PicB | Wild | Prize | PicD | Prize |
| 2 | Q | Prize Wheel | Prize | Prize | Prize |
| 3 | K | Wild | Prize | Prize | Prize |
| 4 | Prize | Prize | Q | Prize | Prize |
| 5 | Prize | 9 | PicD | PicE | Prize |
| 6 | Prize | J | Prize Wheel | Q | Prize |
| 7 | K | Prize | J | A | 10 |
| 8 | PicA | Prize | Q | Wild | 9 |
| 9 | 9 | Prize | PicA | Prize | Wild |
| 10 | Prize | PicA | Prize | Prize | Wild |
| 11 | J | Prize | Prize | Prize | Wild |
| 12 | PicC | Prize | Prize | inn | Prize |
| 13 | Prize | Prize | A | inn | Prize |
| 14 | Prize | inn | J | inn | Prize |
| 15 | Prize | inn | inn | inn | inn |
| 16 | A | inn | inn | inn | inn |
| 17 | Q | inn | inn | J | inn |
| 18 | PicE | inn | Wild | Prize Wheel | inn |
| 19 | J | A | Wild | PicC | inn |
| 20 | inn | PicE | Wild | A | PicA |

FIG. 13B

134

| Stop Position | Random Number Range |
|---|---|
| 1 | 1-50 |
| 2 | 51-100 |
| 3 | 101-150 |
| 4 | 151-200 |
| 5 | 201-250 |
| 6 | 251-300 |
| 7 | 301-350 |
| 8 | 351-400 |
| 9 | 401-450 |
| 10 | 451-500 |
| 11 | 501-550 |
| 12 | 551-600 |
| 13 | 601-650 |
| 14 | 651-700 |
| 15 | 701-750 |
| 16 | 751-800 |
| 17 | 801-850 |
| 18 | 851-900 |
| 19 | 901-950 |
| 20 | 951-1000 |

FIG. 14

| Credit Prize Symbol | Amount of Credits | Selection Probability | Random Number Range |
|---|---|---|---|
| Sym-10 | 10 | 20 | 1-200 |
| Sym-15 | 15 | 20 | 201-400 |
| Sym-20 | 20 | 20 | 401-600 |
| Sym-30 | 30 | 20 | 601-800 |
| Sym-60 | 60 | 10 | 801-900 |
| Sym-150 | 150 | 5 | 901-950 |
| Sym-350 | 350 | 1 | 951-960 |
| Sym-700 | 700 | 1 | 961-970 |
| Sym-1000 | 1000 | 1 | 971-980 |
| Sym-1500 | 1500 | 1 | 981-990 |
| Sym-3000 | 3000 | 1 | 991-1000 |

FIG. 15

138

| Game Symbol | Selection Probability | Random Number Range |
|---|---|---|
| 9 | 15% | 1-150 |
| 10 | 15% | 151-300 |
| j | 15% | 301-450 |
| Q | 10% | 451-550 |
| K | 10% | 551-650 |
| A | 10% | 651-750 |
| PicA | 5% | 751-800 |
| PicB | 5% | 801-850 |
| PicC | 5% | 851-900 |
| PicD | 5% | 901-950 |
| PicE | 5% | 951-1000 |

FIG. 16

FIG. 19B
ULTRA REELS
0
$0.00
WIN
100
$2.00
BET
119340
$1,193.40
CREDIT
ULTRA REELS

FIG. 19C
ULTRA REELS
BONUS MULTIPLIERS
5x WILD
15000
WIN
$150.00
40
BET
999999
CREDIT
BONUS REELS
$50
ULTRA REELS

FIG. 26A
STAR WATCH FIRE
$5,000.00
MEGA
$500.00
$50
MINI BONUS
$20
MAXI
MAJOR
BONUS
MEGA
MEGA
MAXI
MINI BONUS
25
25
999999
75
WIN

FIG. 26B
Game Title
$1,000.00
MEGA
$100.00
$30.00
MINI BONUS
$10.00
MAJOR
BONUS
MEGA
MEGA
SPIN
MINI
BONUS
120
120
999999
40
15000
WIN
KONAMI

GAMING MACHINE, CONTROL METHOD FOR MACHINE, AND PROGRAM FOR GAMING MACHINE

CROSS-REFERENCE TO RELATED APPLICATION

This application is a continuation of U.S. patent application Ser. No. 17/525,515, filed Nov. 12, 2021, which is a continuation of U.S. patent application Ser. No. 15/945,067, filed Apr. 4, 2018 (now U.S. Pat. No. 11,205,317, issued Dec. 21, 2021), which is a continuation-in-part of U.S. patent application Ser. No. 15/479,112, filed on Apr. 4, 2017 (now U.S. Pat. No. 10,510,205, issued Dec. 17, 2019), the disclosures of which is hereby incorporated by reference in their entirety and for all purposes.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine is provided. The gaming machine includes an operation unit, a display unit, a memory device, and a game control unit. The operation unit is configured to receive an operation input of a player. The display unit is configured to display a game screen including computer generated graphics. The game screen includes a plurality of cells arranged in a grid. The memory device stores a game execution program including computer instructions for generating a game using the grid and a feature area. The feature area is one of a plurality of predefined subsets of the cells of the grid. The game control unit executes the game and is coupled to the operation unit, the display unit and the memory device. The game control unit, including a processor, is programmed to display the game screen on the display unit, display a default one of the plurality of predefined subset of the cells on the game screen and allow the player to select another one of the plurality of predefined subsets of the cells using the operation unit and responsively receive a signal from the operation unit indicating a selection, by the player, of one of the plurality of predefined subsets of the cells. The game control unit is further programmed to responsively display the selected predefined subset of the cells on the game screen in response to receiving the signal and provide an instance of the game using the feature area. The feature is one of (1) the default predefined subset of the cells and (2) the selected predefined subset of the cells if the player selects another one of the plurality of predefined subsets of the cells. The processor of the game control unit, in providing the instance of the game, is programmed to randomly select a plurality of symbols associated with the game screen. Each symbol in the plurality of symbols is associated with one of the plurality of cells in the grid. The plurality of symbols form an outcome of the game. The processor of the game control unit, in providing the instance of the game, is programmed to detect an occurrence of a predetermined symbol in the feature area and responsively provide a game feature as a function of the occurrence of the predetermined symbol in the feature area.

In another aspect of the present invention, one or more non-transitory computer-readable storage media, having computer-executable instructions embodied thereon is provided. When executed by a processor, the computer-executable instructions cause the processor to display, on a display unit, a game screen including computer generated graphics. The game screen includes a plurality of cells arranged in a grid. The computer-executable instructions cause the processor to receive an operation input of a player, display a default one of the plurality of predefined subset of the cells on the game screen, allow the player to select another one of the plurality of predefined subsets of the cells using the operation unit and responsively receive a signal from the operation unit indicating a selection, by the player, of one of the plurality of predefined subsets of the cells. The computer-executable instructions cause the processor to responsively display the selected predefined subset of the cells on the game screen in response to receiving the signal and provide an instance of the game using the feature area. The feature is one of (1) the default predefined subset of the cells and (2) the selected predefined subset of the cells if the player selects another one of the plurality of predefined subsets of the cells. The computer-executable instructions, in providing the instance of the game, is programmed to randomly select a plurality of symbols associated with the game screen. Each symbol in the plurality of symbols being associated with one of the plurality of cells in the grid. The plurality of symbols form an outcome of the game. The computer-executable instructions cause the processor to detect an occurrence of a predetermined symbol in the feature area and responsively provide a game feature as a function of the occurrence of the predetermined symbol in the feature area.

In still another aspect of the present invention, a mobile computing device is provided. The mobile computing device includes a touch display unit, a memory device, and a processor. The touch display unit configured to display a game screen including computer generated graphics. The game screen includes a plurality of cells arranged in a grid. The memory device stores a game execution program including computer instructions for generating a game using the grid and a feature area. The feature area is one of a plurality of predefined subsets of the cells of the grid. The game control unit executes the game and is coupled to the touch display unit and the memory device. The game control unit including a processor programmed to display the game screen on the display unit, display a default one of the plurality of predefined subset of the cells on the game screen, allow the player to select another one of the plurality of predefined subsets of the cells using the touch display unit and responsively receive a signal from the touch display unit indicating a selection, by the player, of one of the plurality of predefined subsets of the cells. The game control unit is further programmed to responsively display the selected predefined subset of the cells on the game screen in response to receiving the signal, provide an instance of the game using the feature area, where the feature is one of (1) the default predefined subset of the cells and (2) the selected predefined subset of the cells if the player selects another one of the plurality of predefined subsets of the cells, and randomly select a plurality of symbols associated with the game screen. Each symbol in the plurality of symbols is associated with one of the plurality of cells in the grid. The plurality of symbols form an outcome of the game. The processor of the game control unit, in providing the instance of the game, is programmed to detect an occurrence of a predetermined symbol in the feature area and responsively provide a game feature as a function of the occurrence of the predetermined symbol in the feature area.

BRIEF DESCRIPTION OF DRAWINGS

FIGS. 13A-16 are exemplary illustrations of computer program data files that may be used by the gaming machine shown in FIGS. 1A-1B and the server system shown in FIGS. 11 and 12, according to embodiments of the present invention.

Corresponding reference characters indicate corresponding parts throughout the drawings.

DETAILED DESCRIPTION OF EMBODIMENTS

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine and/or mobile computing device that provides a game to a player.

The present invention improves the functionality of existing gaming machines by providing a game execution program including computer instructions executed by a processor to operate a game that includes a primary game and a game feature utilizing a dynamic feature area. The game feature with the dynamic feature and/or the bonus game increase the flexibility of providing bonus credit awards to players during the primary game, game features and/or bonus gam, thereby, increasing the player's interest in playing the game.

With reference to the drawings, and in operation, the present invention is directed towards a gaming machine, a control method for a gaming machine, and a program for a gaming machine that provides a game to a player. In one embodiment, the game includes a primary game and a feature or bonus game. As will be discussed in further detail below, during the primary and/or bonus game, one of a plurality of predefined subsets of the cells may be established as a feature area as a function of player input. During the primary and/or bonus game, if an occurrence of a predetermined symbol is detected in the feature area, a game feature may be provided.

In one aspect of the present invention, the gaming machine 10 provides a game to the player. The game may include a primary game and a game feature. The game feature may include one or more of (1) a multiplier applied to an award or payline, (2) an award of a predetermined number of credits, (3) a number of free games or spins, and/or (4) a bonus game. For instance, the primary game may be a video slot game, and the game feature may be the awarding of a number of free games or spins in response to the occurrence of a trigger condition, e.g., during the primary game. During the free spins, the game feature may also be provided.

Figure 1A:
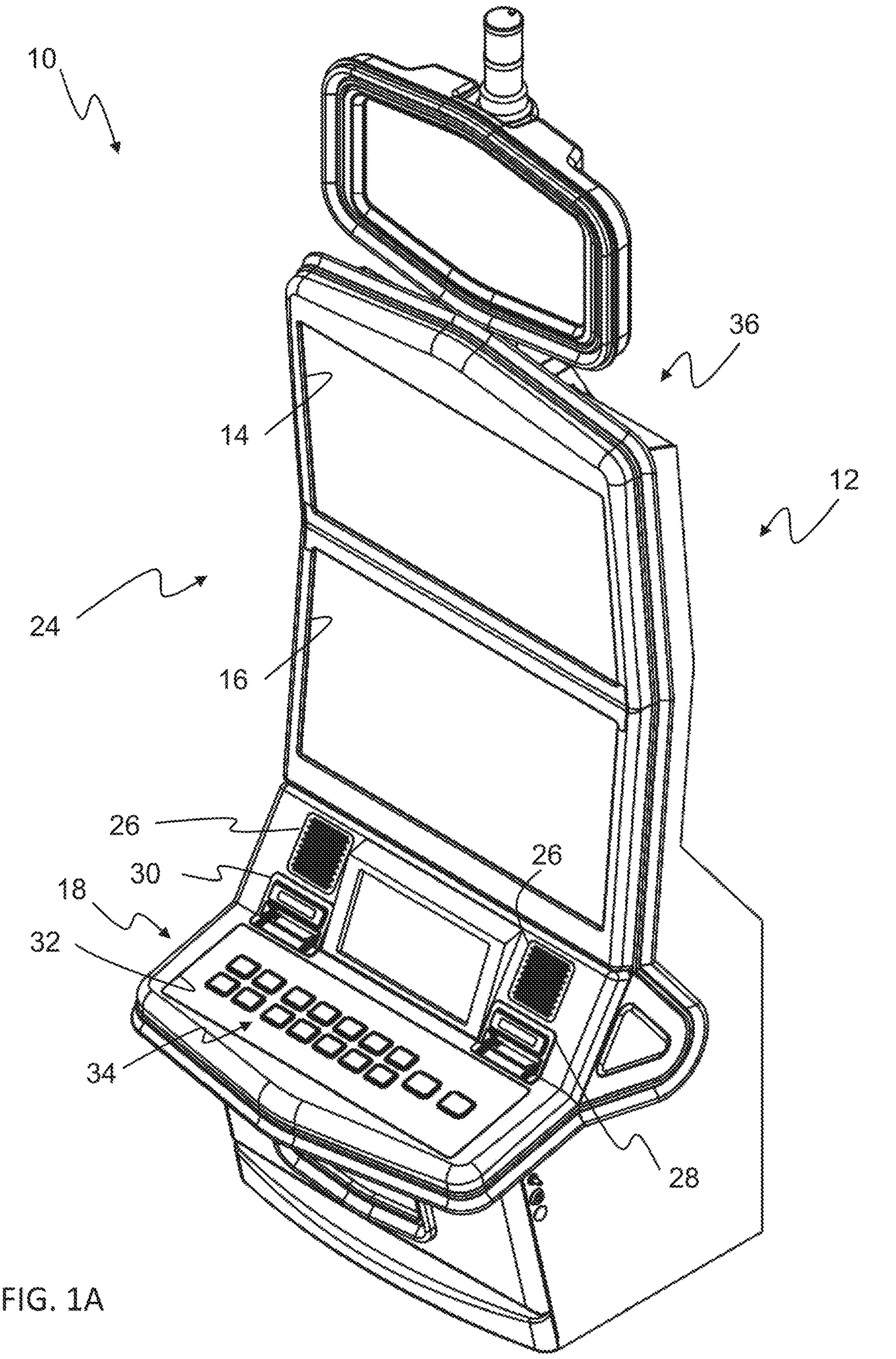
FIG. 1A is a perspective view of the gaming machine, according to the first embodiment.
Figure 1B:
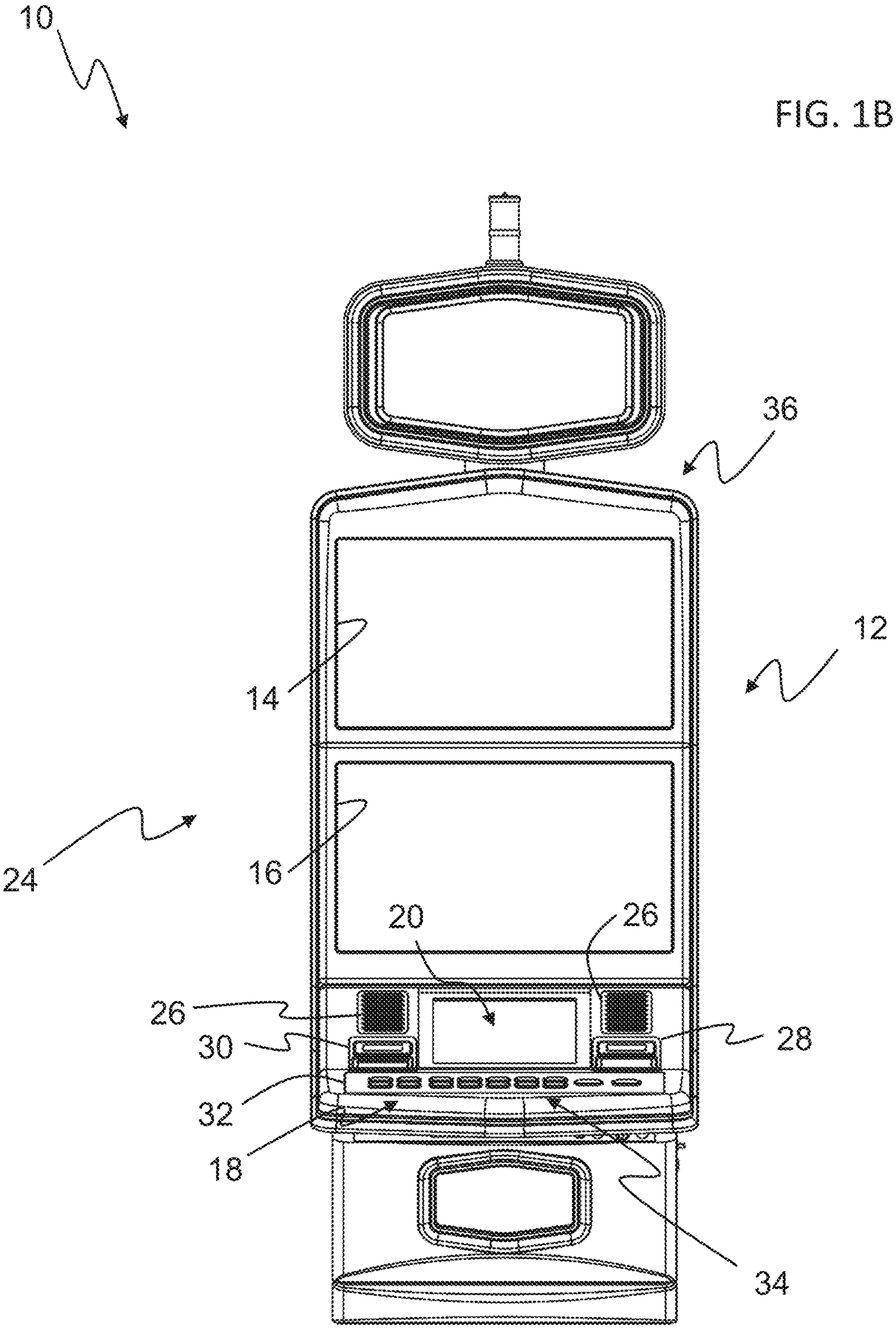
FIG. 1B is a front view of the gaming machine of FIG. 1A.

The gaming machine according to the present embodiment, receives a predetermined game value from the player, generates a game result, and provides a payout to the player according to the game result and one or more pay tables. FIG. 1A and FIG. 1B are a perspective view and a front view, respectively, of a gaming machine 10, according to the present embodiment. As shown in FIGS. 1A and 1B, this gaming machine 10 provides a cabinet 12 providing an upper display 14, a lower display 16, and a control panel 18 and may also house a player tracking or ranking unit 20. The cabinet 12 also houses a game control unit 22 (see FIG. 2) that controls each part (see below). The control unit 22 also implements a random number generator (RNG) that is used during operation of the game. Each configuration is described below.

The upper display 14 and the lower display 16 may be flat panel display devices, such as both liquid crystal display devices and organic EL display devices and the like, and by controlling via each control unit 22, the display area mentioned below functions as a display unit 24 provided to the player.

Speakers 26 are provided on the left and right of the cabinet 12, and by controlling via the control unit 22, sound is provided to the player. On the control panel 18, a bill/ticket identification device 28, a printer device 30, and an operation unit 32 are provided.

The player tracking unit 20 may be housed on the center of the front surface of the cabinet 12 below the lower display 16. The player tracking unit 20 has a card reader that recognizes a player identification card, a display that presents data to the player, and a keypad that receives input by the player. This type of player tracking unit 20 reads information recorded on the player identification card inserted by the player into the card reader, and displays the information and/or information acquired by communicating with the external system on the display, by cooperatively operating with the control unit 22 mentioned below or an external system. Further, input from the player is received by the keypad, the display is changed according to the input, and communication with the external system is carried out as necessary.

The bill/ticket identification device 28 is disposed on the control panel 18 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification device 28, receives and identifies bills/tickets (including vouchers and coupons) that are the game value as a game executing value, and notifies the control unit 22 mentioned below.

The printer device 30 is disposed on the control panel 18 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer device 30, under the control of the control unit 22 mentioned below, prints information on paper and outputs a ticket according to credit payout processing from the gaming machine 10. The output ticket can use the payout credit as game play by being inserted into the bill/ticket identification device 28 of another gaming machine, or, can be exchanged for cash by a kiosk terminal inside of the casino or a casino cage.

The operation unit 32 receives the operation of the player. The operation unit 32 includes a group of buttons 34 that receives various instructions from the player on the gaming machine 10. The operation unit 32, for example, may include a spin button and a group of setting buttons. The spin button receives an instruction to start (start rotating the reel) an instance of the game. The group of setting buttons 34 includes a group of bet buttons, a group of line-designation buttons, a max bet button, and a payout button and the like. The group of bet buttons receives an instruction operation regarding the bet amount of credits (bet number) from the player. The group of line-designation buttons receive an instruction operation that designate a pay line subjected to a line judgment below from the player. The max bet button receives an instruction operation regarding the bet of the maximum amount of credits that can be bet at one time from the player. The payout button receives an instruction operation instructing a credit payout accumulated in the gaming machine 10. The gaming machine 10 also includes illumination devices 36 that provides decorative lighting to the gaming machine 10.

In one embodiment, referring to FIGS. 1A and 1B, the control panel 18 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 24 and/or the player tracking unit 20, the paper money/ticket identification device 28, the operation unit 32, the player tracking unit 20, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a boll, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein.

For example, in one embodiment, the coin slot may include an opening that is configured to receive coins and/or tokens deposited by the player into the gaming machine 10. The control unit 22 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

Figure 2:
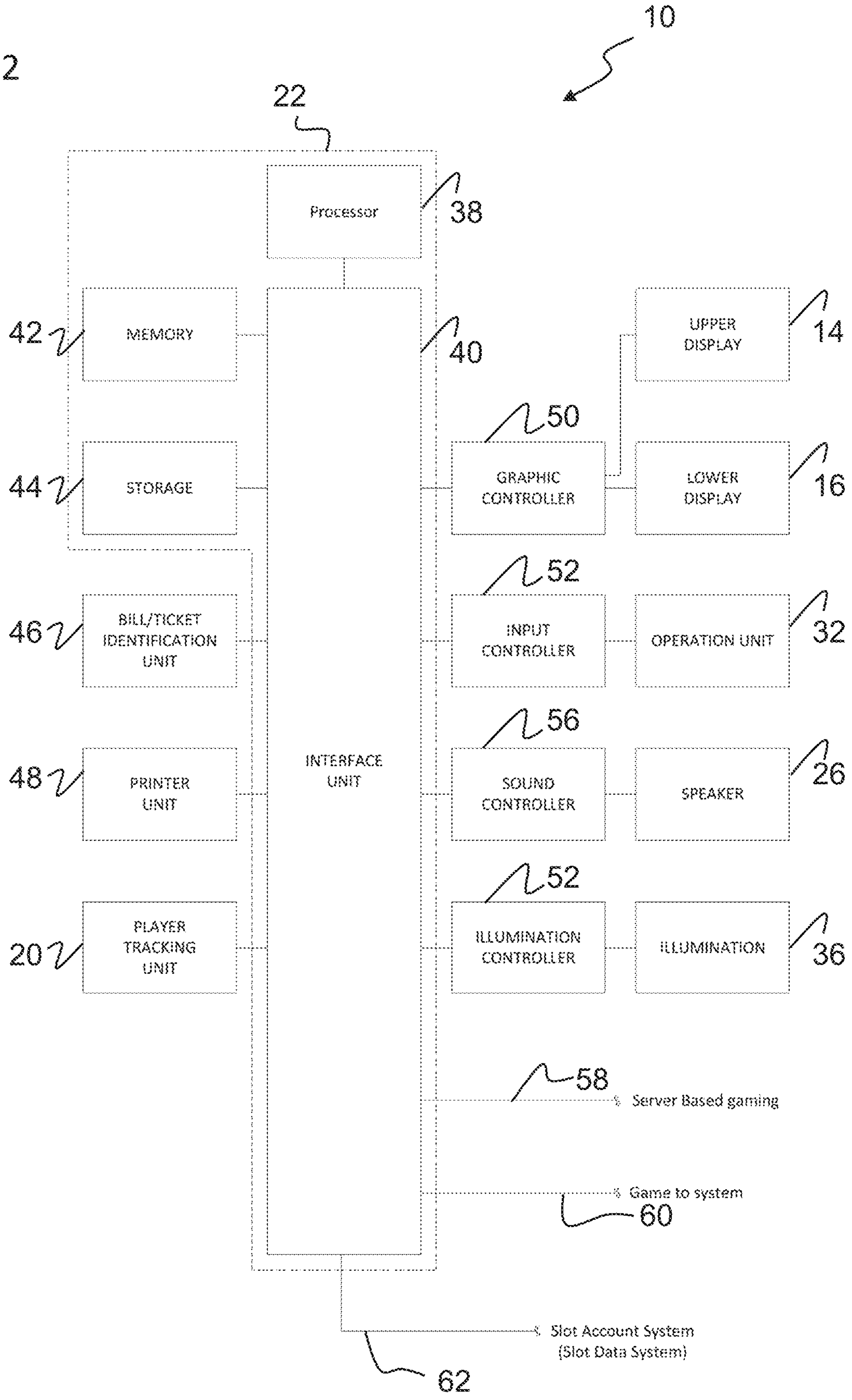
FIG. 2 is a functional block diagram of the gaming machine in FIG. 1A.

With reference to FIGS. 1A, 1B, and 2, further on the inside of cabinet 12, a control board equipped with a central processing unit 38 (abbreviated as CPU below) including a processor that configures the control unit 22, an interface unit (or part) 40, a memory 42 and a storage 44 and the like are incorporated. The control board is configured so that communication is possible through the interface unit 40 and each of the components equipped on the cabinet 12, controls the operation of each part by executing the program recorded in the memory 42 or the storage 44 of the CPU 38, and provides a game to the player. The function of the CPU 38 is to execute and display the game on the displays 14, 16 of the gaming machine 10.

FIG. 2 shows a functional block diagram of the gaming machine 10, according to the present embodiment. The gaming machine 10 provides the control unit 22. The control unit 22 is configured as the interface unit 40 including a chip set providing communication functions of the CPU 38, a memory bus connected to a CPU 38, various expanding buses, serial interfaces, USB interfaces, Ethernet (registered trademark) interfaces and the like, and a computer unit where the CPU 38 provides the addressable memory 42 and the storage 44 through the interface unit 40. The memory 42 can be configured to include RAM that is a volatile storage medium, ROM that is a nonvolatile storage medium, and EEPROM that is a rewritable nonvolatile storage medium. The storage 44 provides the control unit 22 as an external storage device function, can use reading devices such as a memory card that is a removable storage medium, and a magneto optical disk and the like, and can use hard disks.

On the interface unit 40, in addition to the CPU 38, the memory 42, and the storage 44, a bill/ticket identification unit controller 46, a printer unit controller 48, the player tracking unit 20, a graphic controller 50, an input controller 52, and a sound controller 54 are connected. That is, the control unit 22 is connected to the operation unit 32 through the input controller 52, and connected to the upper display 14 and/or the lower display 16 through the graphic controller 50. Further, when illumination devices 36 that provides decorative lighting to the gaming machine 10 is provided, the illumination is controlled under the control of the control unit 22 on the interface unit 40, and an illumination controller 56 that controls the illumination devices 36 to provide a decorative lighting effect may be connected.

The control unit 22, which includes memory 42 and storage 44, controls each part by executing a program stored in the memory 42 and the storage 44, and provides a game to the player. Here, for example, the memory 42 and storage 44 may be configured to store a program and data of an operating system and subsystem that provide the basic functions of the control unit 22 to the EEPROM of the memory 42, and stores a program and data of an application that provides a game to the storage 44. According to such a configuration, it can be easy to change or update a game by replacing the storage 44. Further, the control unit 22 may be a multiprocessor configuration that has a plurality of CPUs.

Each block connected to the control unit 22 is described below. The bill/ticket identification unit controller 46 operates the bill/ticket identification device 28 to receive bills/tickets in the insertion opening, and notifies the control unit 22 of identifying information corresponding to the assortment of bills or the payout processing of credits. The bill/ticket identification unit controller 46 notifies the information to the control unit 22, and the control unit 22 increases the usable credit amount inside of the game according to the notified content. The printer unit controller 48 corresponds to the printer device 30, and under the control of the control unit 22 that receives an operation of the payout button of the group of setting buttons 34, information corresponding to the credit payout processing from the gaming machine 10 is printed and output on a printed ticket.

The player ranking (or tracking unit) unit 20 cooperatively operates with the control unit 22, and sends and receives information and the like of the player from the casino management system. The graphic controller 50 controls the upper display 14 and the lower display 16, under the control of the control unit 22, and displays a display image that includes various graphic data. The sound controller 54 drives the speakers 26 under the control of the control unit 22, and provides various sounds such as an announcement, sound effects, BGM and the like.

Further, the interface unit 40, has various communication interfaces for communicating with the exterior of the gaming machine 10, for example the interface unit 40 can communicate with an external network by Ethernet 58, 60, and a serial interface 62. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3A:
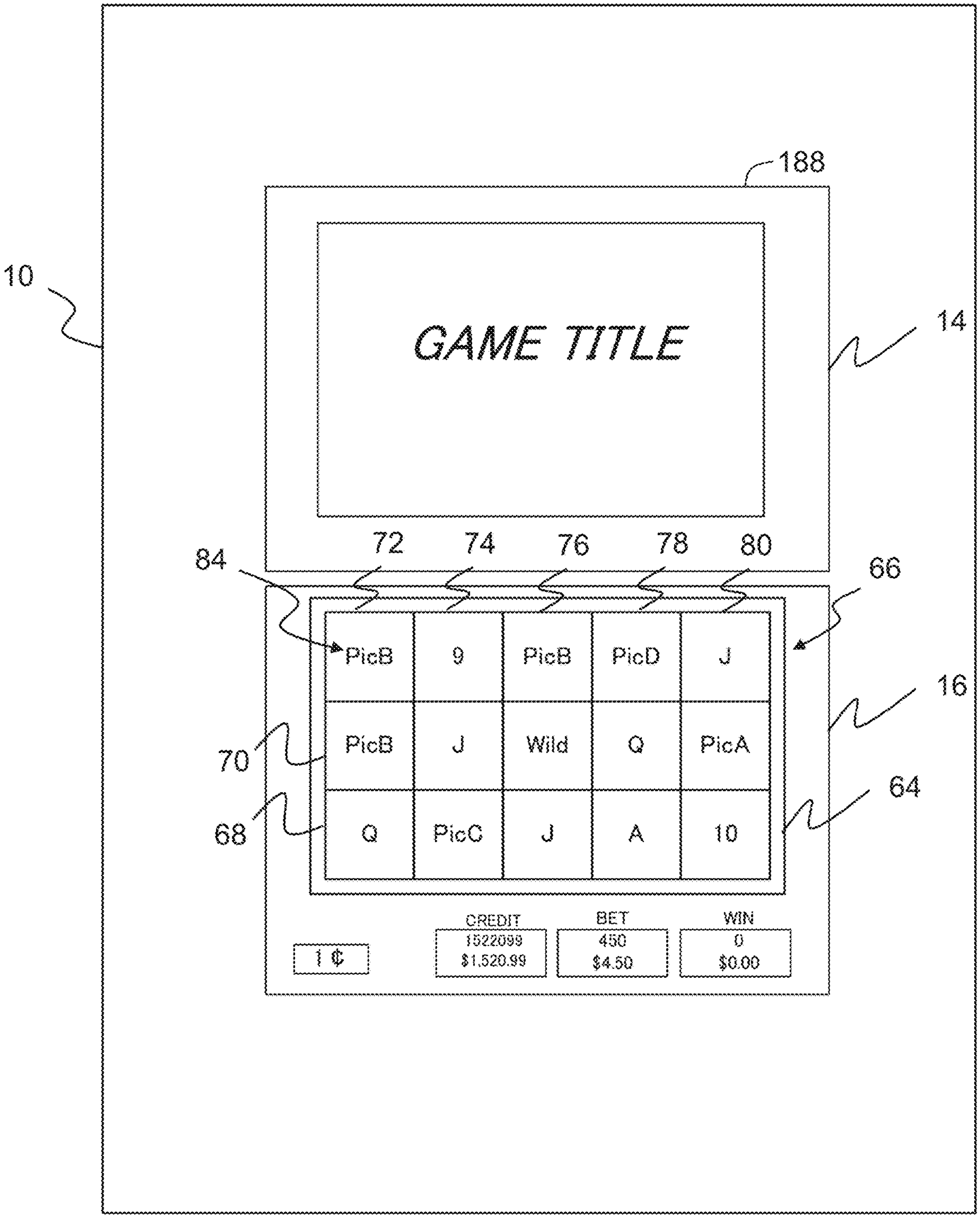
FIGS. 3A and 3B are diagrammatic illustrations of a display area of the gaming machine in FIGS. 1A-2, according to an embodiment of the present invention.
Figure 3B:
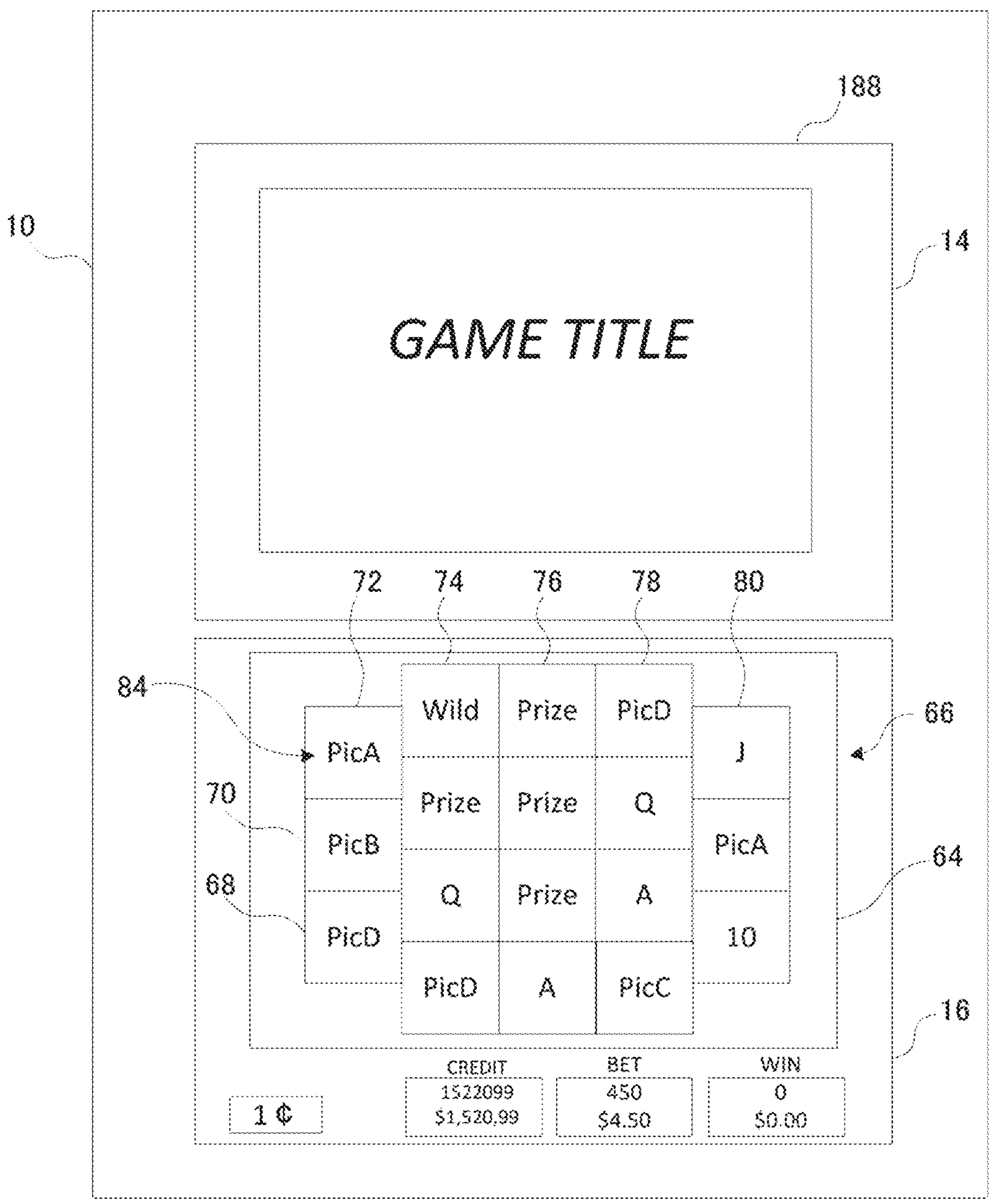

FIGS. 3A and 3B schematically show a game screen or display area 64 provided by the gaming machine 10. Such a display area 64 is displayed on the display unit 24 (the upper display 14 and/or the lower display 16) by the control unit 22 executing a predetermined program. In the illustrated embodiment, the display area 64 is displayed on the lower display 16. For instance, as shown, during a game, the upper display 14 may be utilized to display game related information, e.g., game title information and/or graphics. Alternatively, the upper display 14 may be used to display a bonus game screen indicating a bonus wheel game, a bonus slot game or a bonus and the like.

In one aspect of the present invention, the gaming machine 10 provides a video slot game using a plurality of virtual reels 66. The video slot game utilizes a grid 68 in the display area 64. The illustrated embodiment shows the state of displaying the display area 64 in the lower display 16. As shown in FIGS. 3A and 3B, the display area 64 includes the grid 68 for displaying symbols. By using such a display area, the gaming machine 10 of the present embodiment operates as a slot machine that pays a payout according to a winning combination of symbols displayed on the display area 64.

The display unit 24 displays a plurality of symbols in the grid 68. The grid 68 has a plurality of rows (r) and columns (c). The grid 68 is configured by a plurality of cells 70 that are the stop position of symbols. FIG. 3A shows a game screen with 3×5 grid and FIG. 3B shows a game screen with 3-4-4-4-3 grid.

With reference to FIGS. 3A and 3B, the grid 68 may be displayed on the lower display 16. The upper display 14 may be used to display animations and/or game identifying information during the game and/or during an attract mode. Further, the display unit 24 can display a decorative area, and an area that displays credit amount, bet number, and a credit amount obtained by winning (WIN number) and the like, outside of the grid 68. On each of the plurality of cells 70 of the display area 64, one symbol is stopped and displayed.

Figure 4A:
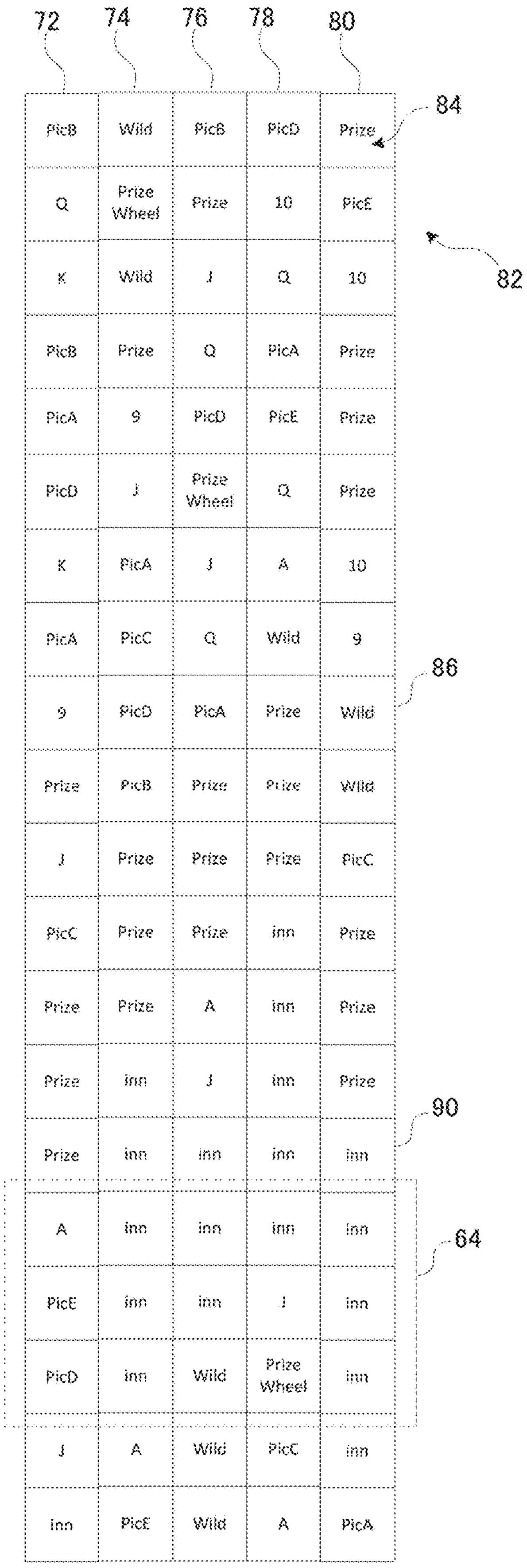
FIGS. 4A and 4B are illustrations of exemplary virtual reel strips with symbol arrangements showing the order of symbols displayed on the display area, according to an embodiment of the present invention.
Figure 4B:
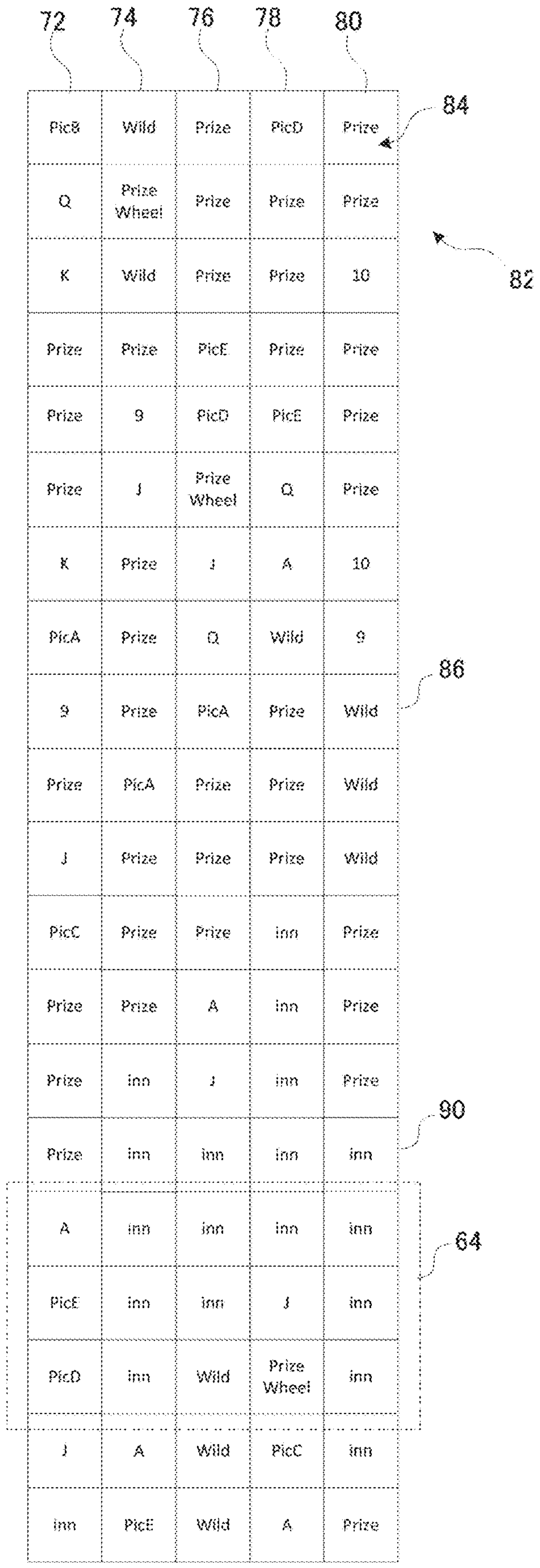

On each cell 70 of the grid 68, as shown in FIGS. 3A, 3B, 4A and 4B, a symbol is displayed based on the symbol arrangement of virtual reels 66 including virtual reel strips 72, 74, 76, 78, and 80 configured as a virtual reel set 82. That is, the cells 70 of the grid 68 correspond to the virtual reel strips 72 to 80 by column, and the symbols disposed on predetermined parts of each virtual reel strip 72 to 80 are displayed. Furthermore, by moving (scrolling or spinning) each symbol by column based on the symbol arrangement of the virtual reel strips 72 to 80, the symbols displayed in the cells 70 of the grid 68 change, and by stopping the movement (scrolling or spinning) by columns, the symbols are stopped. Here, the virtual reel strips 72 to 80 are data where the control unit 22 uses a program having the memory 42 or the storage 44, and data showing the symbol arrangement (i.e., the order of symbols on each reel strip) regulated by each cell column. Further, the virtual reel set 82 is a general term for such virtual reel strips 72 to 80. In one embodiment, the virtual reel set 82 shown FIG. 4A is used in the primary game and the virtual reel set 82 shown in FIG. 4B is used in the bonus free game.

Figure 5:
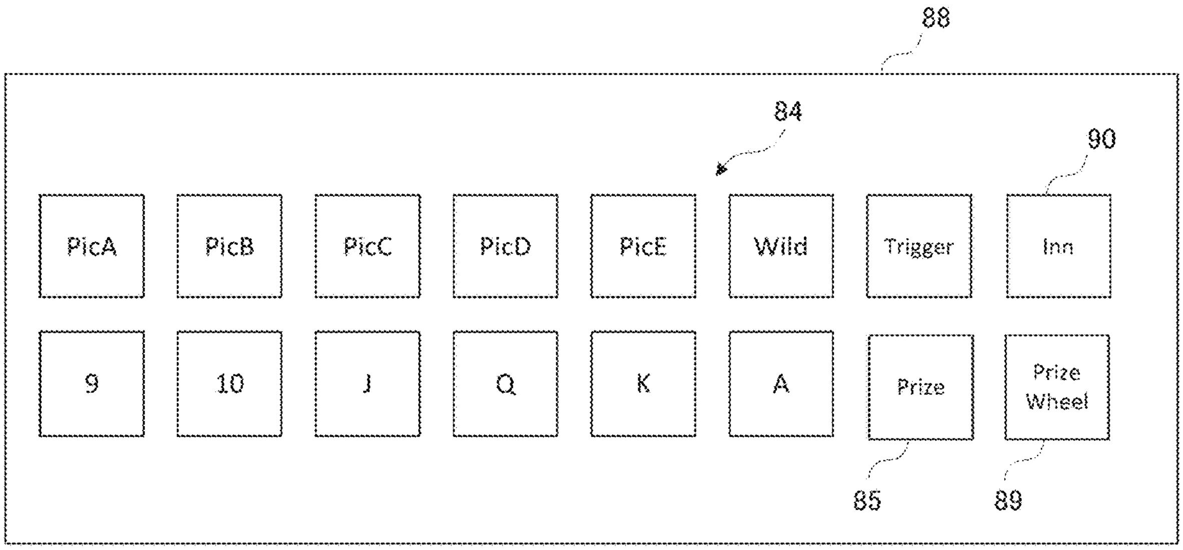
FIG. 5 is a figure showing the symbols displayed on the display area, according to an embodiment of the present invention.

Each virtual reel strip 72 to 80, in the examples of FIGS. 4A and 4B, may be configured by 20 symbols 84 in respective symbol positions 86, and those symbols are aligned in an order defined by each reel. FIG. 5 is the details of symbols 84 of the figure shown in FIGS. 3 and 4. Each virtual reel strip 72 to 80 includes symbols selected from a symbol set 88 of varieties of symbols 84 shown in FIG. 5. This symbol set 88 includes card symbols ("9", "10", "J", "Q", "K", and "A") that imitate playing cards as regular symbols, and picture symbols ("PicA", "PicB", "PicC", and "PicD") that show a pattern. Further, this symbol set 88 includes a wild symbol ("Wild") that is substituted as another symbol when a win combination is determined and a trigger symbol ("Trigger" or "Scatter") that may be used to determine if a game feature is to be provided. Each of these symbols have a different rank from each other regarding their value when winning, their rank gradually raises in this order: "9", "10", "J", "Q", "K", "A", "PicE", "PicD", "PicC", "PicB", "PicA". A combination of symbols that includes high-ranking symbols when winning, can obtain a larger winning payout compared to a combination of low-ranking symbols when winning. In the illustrated embodiment, the symbol set 82 further includes a plurality of credit prize symbols 85 ("Prize"). Each credit prize symbol 85 indicates various credit amounts that may be awarded to the player during a game. In one embodiment, the various credit amounts may include credit amount value randomly chosen from 10, 15, 20, 30, 60, 150, 350, 700, 1000, 1500 and 3000 credits for each game. Each credit amount value may be multiplied by the bet per line at the beginning of each spin. In addition to the credit amounts, the credit prize symbol may indicate a progressive bonus and/or a bonus game trigger that may be awarded to the player during a game.

Returning to FIGS. 4A and 4B, in one embodiment, some of the symbol positions have a fixed symbol and others of the symbol positions have a varying symbol, represented by a varying inner symbol 90 ("inn"). In the illustrated embodiment, for each play of the game, the fixed symbol positions have an associated predefined symbol from the set of symbols 84, and the varying symbol 90 has a symbol that is randomly selected from the symbol set 88. For example, in one embodiment of the present invention, for each play of a game, one of the symbols from a sub-group of symbols included in the symbol set 88 is randomly selected and associated/displayed in the varying symbol positions 86. The sub-group may include, for example, "PicA", "PicB", "PicC", "PicD", "PicE", "A", "K", "Q", "J", "10", and "9". In one embodiment, the same randomly selected symbol from the second sub-group of symbols is associated with or displayed in the varying symbol positions.

In another aspect of the present invention, all of the varying symbol positions or feature symbol positions (indicated as "inn") are arranged in groups (or stacks) of adjacent symbol positions (within a reel strip).

It should be noted that in one aspect of the present invention, one or more dynamic virtual reel strips may be utilized. Using virtual reel strips, the symbols and/or symbol positions and/or virtual reel strips and/or length or size and/or any aspect of a virtual reel strip may change from one spin or play to the next. For example, a dynamic reel strip includes a plurality of symbol positions with symbols from the symbol set 88 and a plurality of varying symbol positions ("inn"). The varying symbol positions may be in the form of one or more stacks, i.e., adjacent symbol positions. In one embodiment, the location and/or size of the stacks may change from one spin to the next, either randomly and/or in a predetermined pattern.

Alternatively, a virtual reel strip associated with a cell 70 (or column of cells 70) may be dynamically changed from one spin or play to another spin or play. This, may occur randomly, every spin or play and/or in a predetermined pattern.

It should be noted that in the illustrated embodiment, each column of the grid 68 has a corresponding reel strip. When the reel strip stops, a symbol from the respective reel strip appears in each one of the cells of the respective column of the grid 68. One or more of the reel strip 72 to 80 may be identical or all of the reel strip 72 to 80 may be different.

In an alternative embodiment, however, each cell 70 of the grid 68 has a respective independent reel that may spin independently of the other reels. Each cell 70 of the grid 68 may, thus, have an independent reel with a corresponding virtual reel strip 72 to 80. The virtual reel set 82 may include different number of virtual reel strips in such a case. For example, in an example in which a 3×5 grid is utilized, each cell 70 would have an associated virtual reel strip, so fifteen reel strips would be utilized. As above, one or more of the fifteen virtual reel strips may be identical or all reel strips may be different.

In the next several embodiments, the present invention will be described with respect to a 3×5 grid as shown in FIG. 3A, however, it should be noted that the present invention is not limited to a grid with any specific size and/or shape.

In general, the control unit 22 starts a game and determines the stop position of each virtual reel strip 72 to 80 randomly. The virtual reel strips 72 to 80 that are displayed in the display unit 24 (for example, the lower display 16) are moved from a current position, and stopped based on a stop position to express an outcome of the game. Due to this, in the display or grid 68, the symbols included on the virtual reel strips 72 to 80 are continuously moved (scrolled or spun) in a vertical direction of the display area 64, and one symbol of one cell 70 is aligned in an order of the symbol based on the symbol arrangement is stopped so that it is displayed.

The control unit 22 changes and stops the plurality of symbols displayed on the display unit 24 according to the operation of the player received by the operation unit 32, and a payout may be paid according to the stopped symbols inside the display area 64.

In the display area 64, a pay line is set that is used when winning is determined. The pay line is set to be extended over the column on the right end from the cells of the column of the left end, and is a line that combines the plurality of cells 70 determining a win. The number of effective lines within the set pay line is selected by the operation of a group of line designation buttons included in the group of setting buttons 34 of the operation unit 32 for the player. The control unit 22, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 64 is set (see FIG. 3). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line. In addition, more than a predetermined number of the "Trigger" form a win combination or trigger condition regardless of the pay line.

Figure 6:
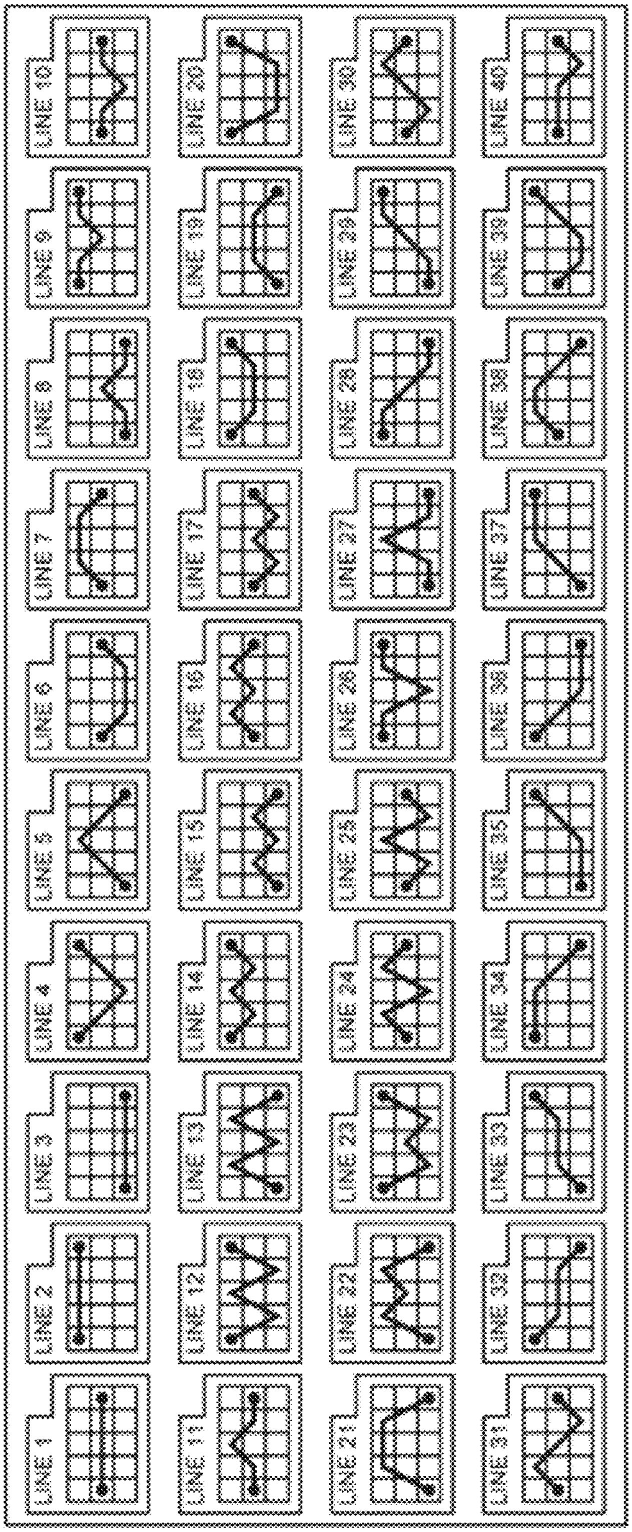
FIG. 6 is a figure showing one example of a pay line set on the determination area in FIG. 5.
Figure 7:
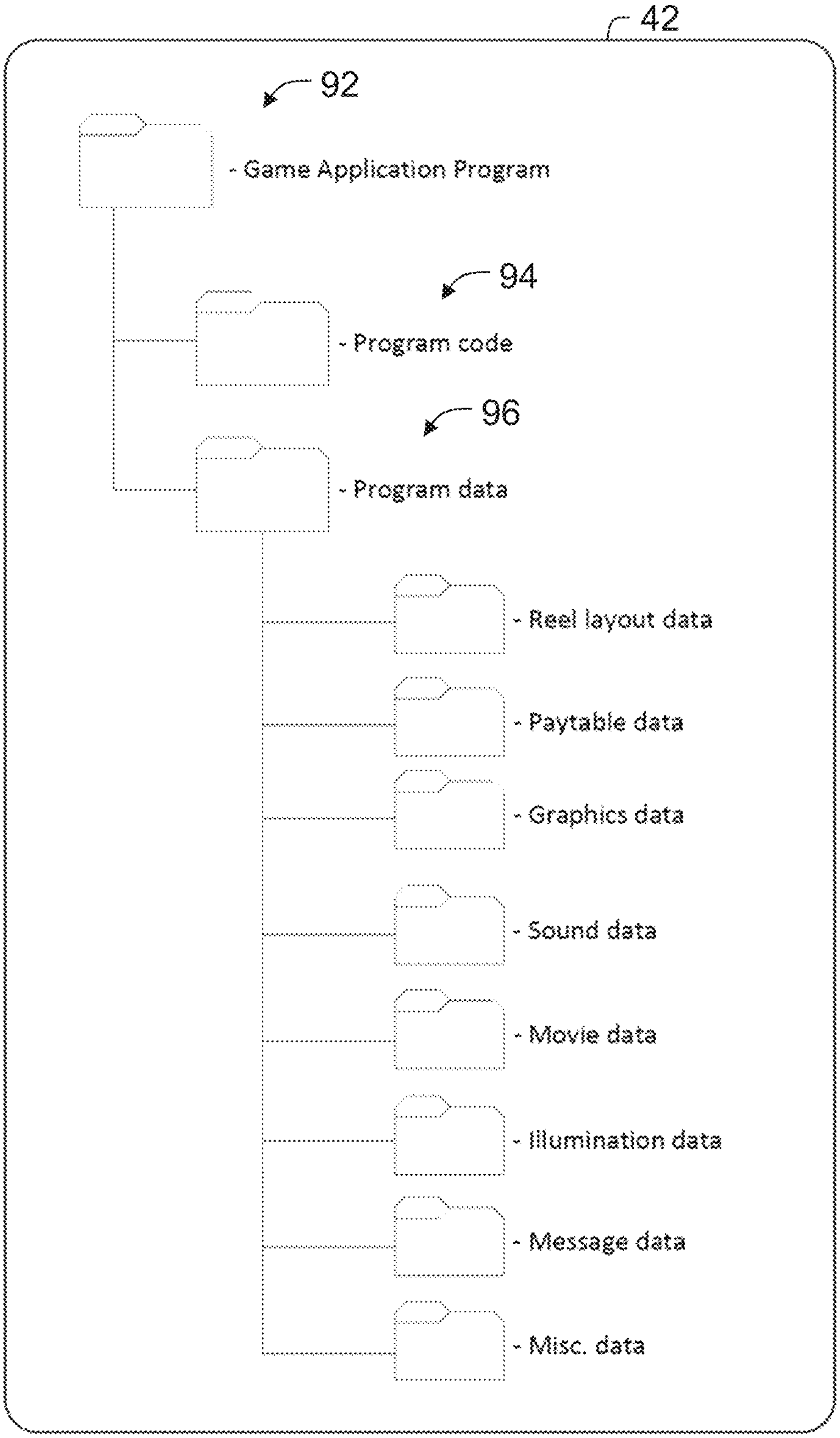
FIGS. 7-10 are block diagrams of a game control unit that may be used with to perform the function of executing a game on the gaming machine shown in FIGS. 1A-2.
Figure 8:
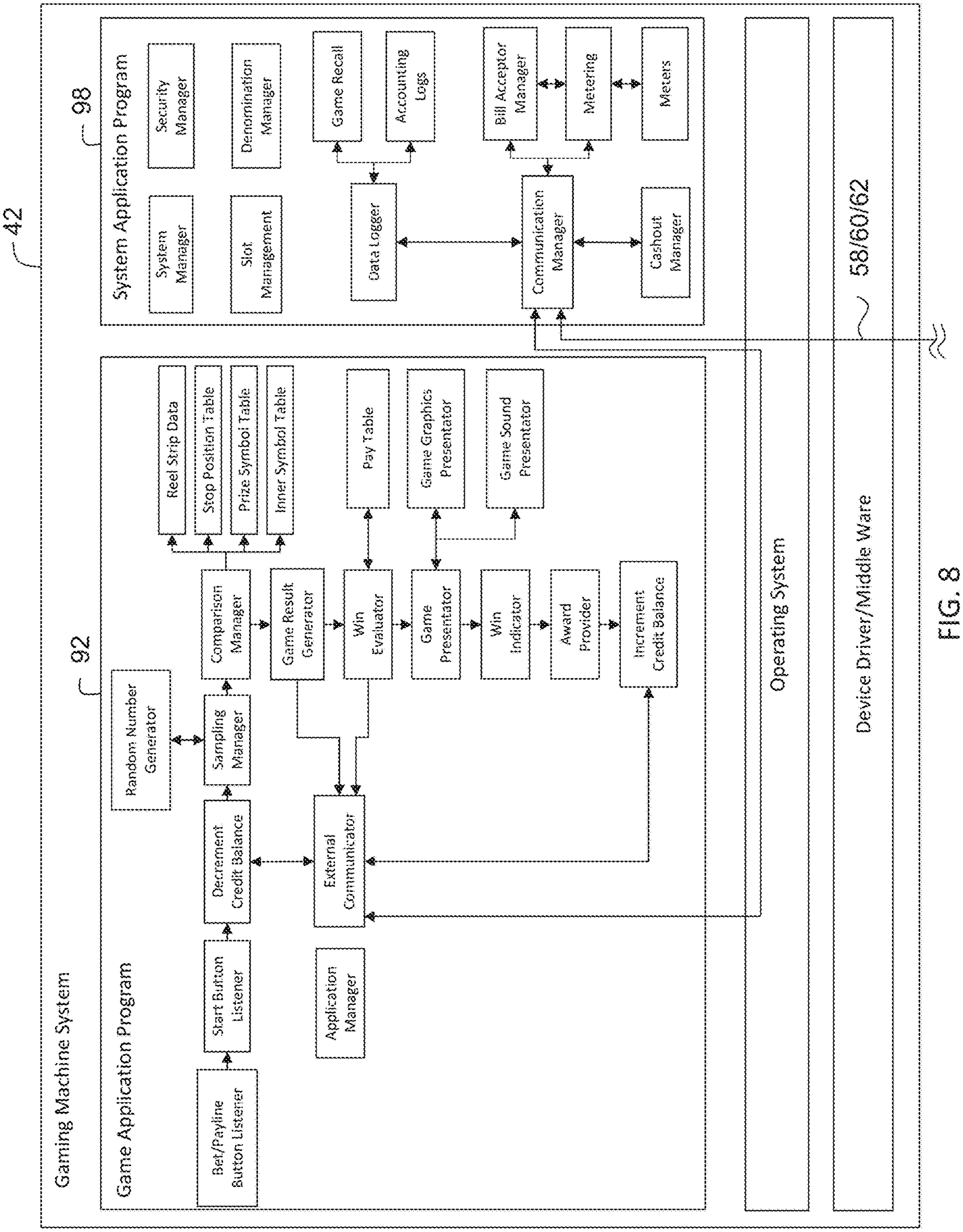
Figure 9:
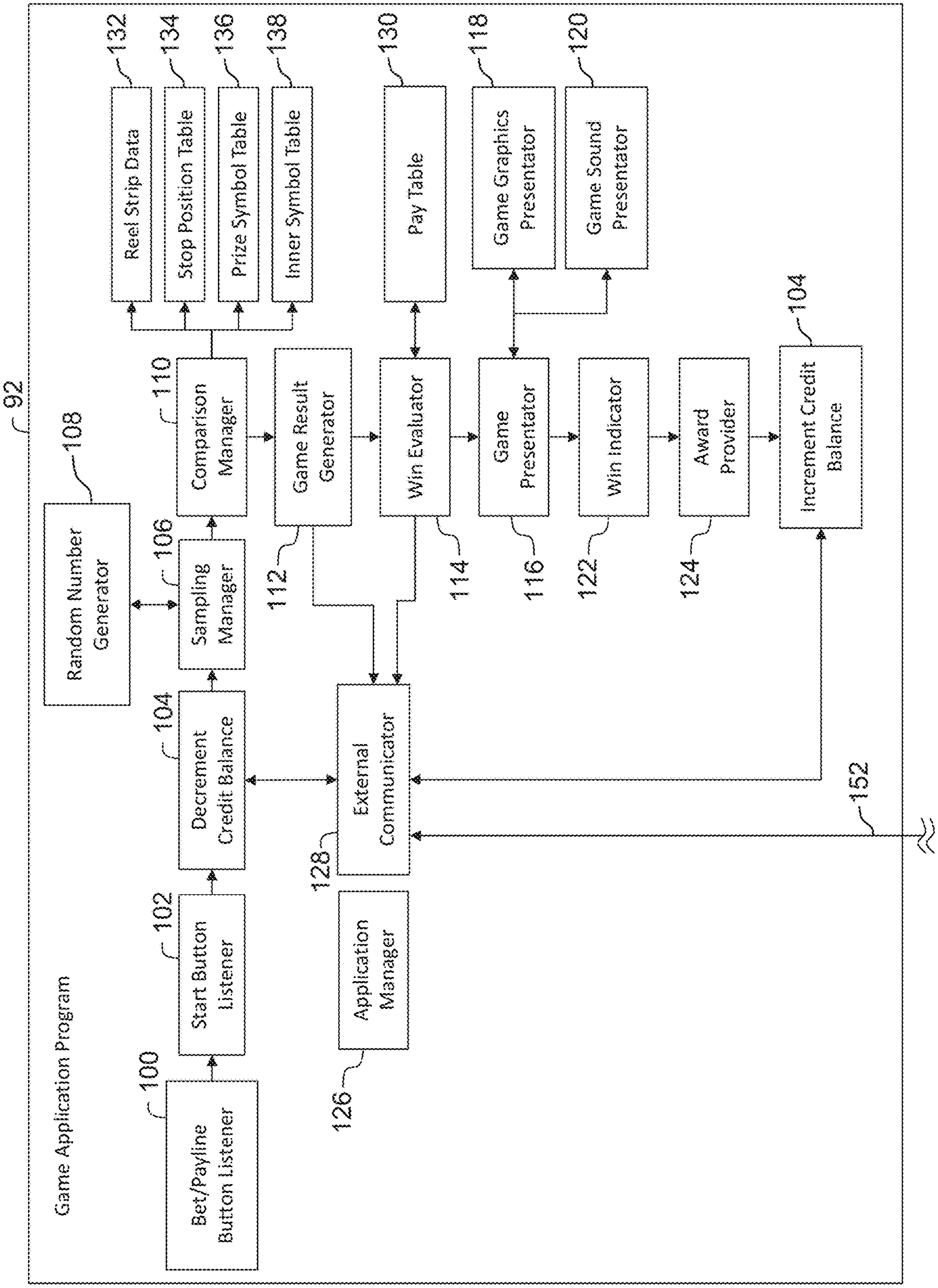
Figure 10:
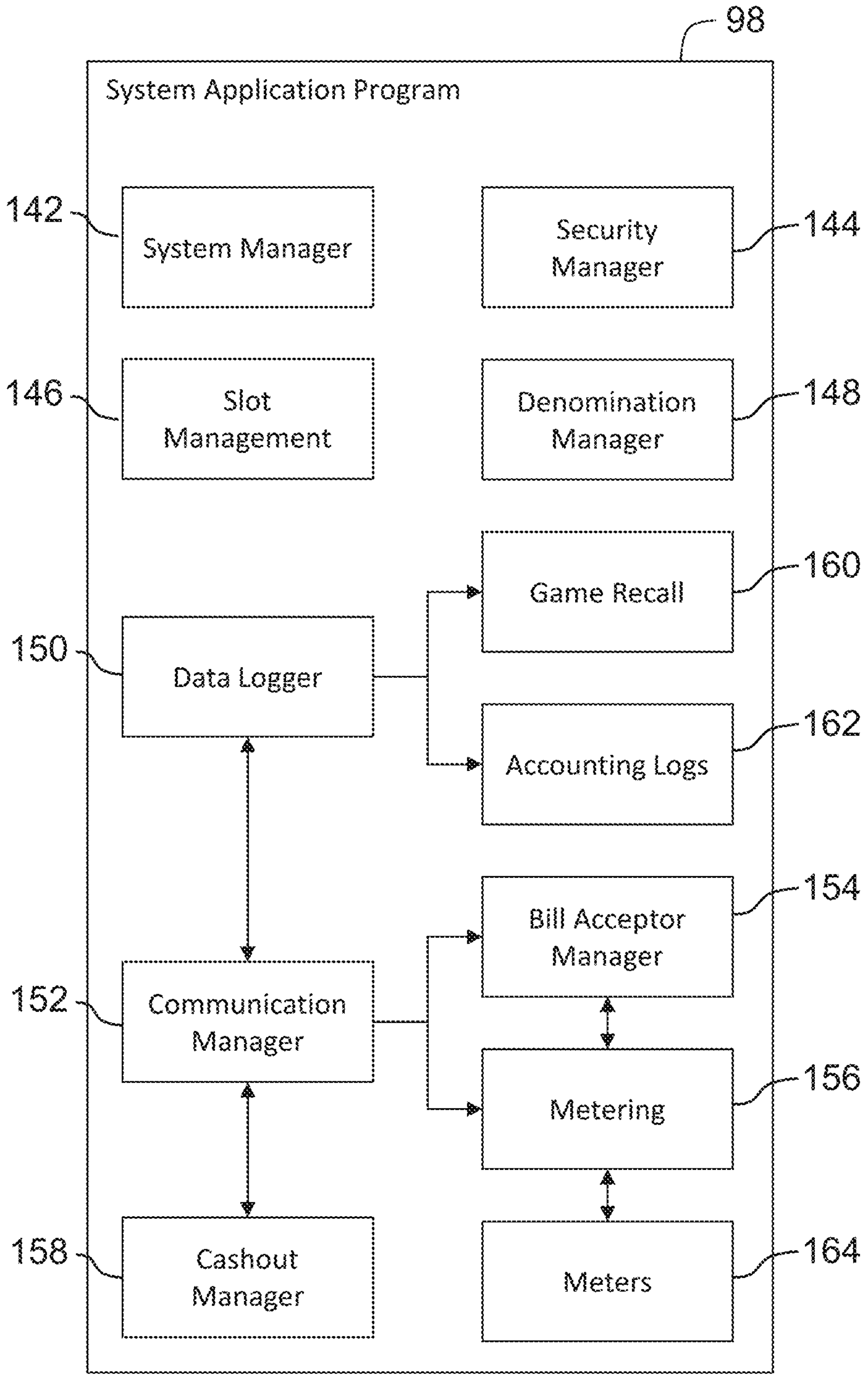

It should be noted that pay lines shown other than (or in addition to) the pay lines shown in FIG. 6 may be used. In general, the pay lines shown in FIG. 6 start in the first column and end in the last column, and include one cell per column. However, one or more pay lines could include one or more cells in the same column and may include a vertical pay line.

Referring to FIGS. 7-10, in the illustrated embodiment, the memory 42 stores a game application program 92 that includes computer executable instructions that, when executed by the processor 38, cause the processor 38 to generate and display the game on the display unit 24 of the gaming machine 10. In one embodiment, the game application program 92 includes program code 94 and program object data 96 that includes computer executable instructions for implementing a game using the algorithms shown in FIGS. 18 and 23.

In the illustrated embodiment, the memory 42 stores the game application program 92 and a system application program 98 that includes computer executable instructions that, when executed by the processor 38, cause the processor 38 to generate and display the game on the display unit 24 of the gaming machine 10. The application program 92 provides game specific/front-end functions and the system application 98 program provides generic/back-end functions, when executed by the processor 38. In the illustrated embodiment, the application program 92 and the system application program 98 are implemented on the same operating system. However, it should be noted that these programs may be implemented on different operating system and/or by different processors. In one embodiment, the game application program 92 includes a plurality of software modules including a bet/payline button listener module 100, a start button listener module 102, a credit balance manager module 104, a sampling manager 106, a random number generator 108, a comparison manager 110, a game result generator 112, a win evaluator 114, a game presentator 116, a game graphics presentator 118, a game sound presentator 120, a win indicator 122, an award provider 124, an application manager 126, an external communicator 128. The game application program 92 may also include a pay table 130, a reel layout table 132, a stop position table 134, a prize symbol table 136, an inner symbol table 138, and a multiplier feature table 140.

The bet/payline button listener module 100 is a software module for receiving a signal from the bet button or the payline button which is generated by the button when a player operates the button to select number of bet or number of paylines. In response to receiving the signal, the bet/payline button listener module 100 communicates the occurrence of the signal to application manager 126 for changing bet or payline configuration of the game.

The start button listener module 102 is a software module for receiving a signal from the start button which is generated by the button when a player operates the button to start a game. In response to receiving the signal, the start button listener module 102 communicates the occurrence of the signal to application manager 126 for starting the game.

In response to receiving the signal from start button listener module 102, the application manager 126 requests the sampling manager 106 to obtain necessary number of random numbers from the random number generator 108.

The random number generator 108 generates random numbers based on predetermined algorithm of computational random generation method. The random number generator 108 may be a pseudorandom generator. In response to a request from sampling manager 106, the random number generator 108 returns random number. In some implementations, the random number generator 108 may be implemented in a central server. The random number generator 108 may be implemented as an integrated circuit or hard wired logic.

The comparison manager 110 compares the current state of the game or each random number with the reel layout table 132, the stop position table 134, the bonus feature table 136, the inner symbol table 138 and/or the multiplier feature table 140 and specifies corresponding reel layout, stop position, prize symbol, inner symbol or event symbol based on each random number.

The reel layout table 132 (also shown in FIG. 13) includes a set of virtual reels strips for a primary game and a free game bonus. The comparison manager 110 inquires the application manager to identify current state of the game and select the sets of virtual reel strips.

The stop position table 134 (also shown in FIG. 14) includes a random number range associated with each stop position of a virtual reel strip. The comparison manager 110 identify a stop position of each reel based on corresponding random number and the stop position table 134.

The prize symbol table 136 (also shown in FIG. 15) includes a random number range and/or selection probability associated with a value of each prize symbol. The comparison manager 110 identifies a value of each prize symbol based on corresponding random number and the prize symbol tables 136.

The inner symbol table 138 (also shown in FIG. 16) includes a random number range associated with each stop position of a virtual inner reel. The comparison manager 110 identifies a stop position of the virtual inner reel based on corresponding random number and the inner symbol table 138. A gaming machine utilizing data tables is described in U.S. patent application Ser. No. 15/928,902, filed on Mar. 22, 2018, which is herein incorporated by reference.

The game result generator 112 generates game result based on selected reel layout, stop positions of each reel, stop position of inner symbol, and bonus features. In one embodiment, the game result generator may apply a modification on the game result when a predetermined condition is satisfied (see below).

The win evaluator 114 evaluates the game result with reference to the pay table 130.

The game presentator 116 provides game presentation process with visual and sound so as to form the predetermined game result finally.

The game graphics presentator 118 provides visual game presentation process on the display so as to form the predetermined game result finally.

The game sound presentator 120 provides sound presentation process by using sound controller and speakers.

The win indicator 122 indicates win combinations and payment condition of prize symbol formed in the game result.

The award provider 124 provides award credit to win meter based on the win evaluation.

The application manager 126 administrates activity and status of each software module. In addition, the application manager 126 administrates configuration, progress and states of the game application program 92.

The external communicator 128 communicates instruction and data with the system application program 98.

The credit balance manager module 104 executes a process for decrementing credit balance and incrementing credit balance based on win amount displayed in win meter.

The pay table 130 includes a prize associated with each win combination.

In the illustrated embodiment, the system application program 98 provides back ground processing and functions other than game specific functions. The system application program 98 includes a plurality of software modules including a system manager 142, a security manager 144, a slot management module 146, a denomination manager 148, a data logger 150, a communications manager 152, a bill acceptor manager 154, a metering module 156, and a cashout manager 158.

The system application program 98 may also include a game recall file 160, accounting logs 162, and meters 164.

The system manager 142 is a software module for administrating all of the back ground processing and functions other than game specific functions conducted by the system application program 98.

The security manager 144 is a software module for administrating game verification, door security and monitoring security sensors.

The slot management module 146 is a software module for administrating data accumulation and communicating with external slot information system 62.

The denomination manager 148 is a software module for establishing denomination setting of the gaming machine 10. The denomination setting may include 1 cent, 2 cent, 5 cent, 25 cent, 1 dollar, 5 dollar and the like.

The data logger 150 is a software module for logging result of each primary game and the free game bonus to the game recall. In addition, the data logger 150 stores error events, bill log, cashout log, ticket log etc. to the accounting log.

The game recall file 160 is an accumulated data including results of each primary game and free game bonus. The game recall file 160 is stored in a non-volatile memory.

The accounting logs 162 is an accumulated data including error events, bill log, cashout log, ticket log etc. The accounting logs 162 are stored in a non-volatile memory.

The communications manager 152 is a software module for administrating communication between game application program 92 and system application program 98. The communications manager 152 also administrates network communication between system application program 98 and external network such as slot management system network, G2S network, gaming server for server based gaming network or VLT system network.

The bill acceptor manager 154 is a software module for administrating the bill acceptor and receives bill information inserted in the bill acceptor. In response to receiving the information from the bill acceptor, the bill acceptor manager 154 communicates with the metering for incrementing credit balance based on the inserted bill.

The metering module 156 is a software module for adjusting values of the meters 164 in response to communication with the game application program 92 via communications manager 152, the bill acceptor manager 154 or the cashout manager 158. The meters 164 includes a credit meter for indicating current credit balance on the gaming machine and a win meter for indicating win amount of current game session. The meters further include back ground meters such as coin-in, coin-out, total drop, attendant paid jackpots and/or bill-in. These meters might be implemented as data on the non-volatile memory or hardware meters.

The cashout manager 158 is a software module for administrating cashout procedure. In response to a player's operation on the cashout button, the cashout manager 158 is activated and the gaming machine pay total amount of the credit meter.

Figure 11:
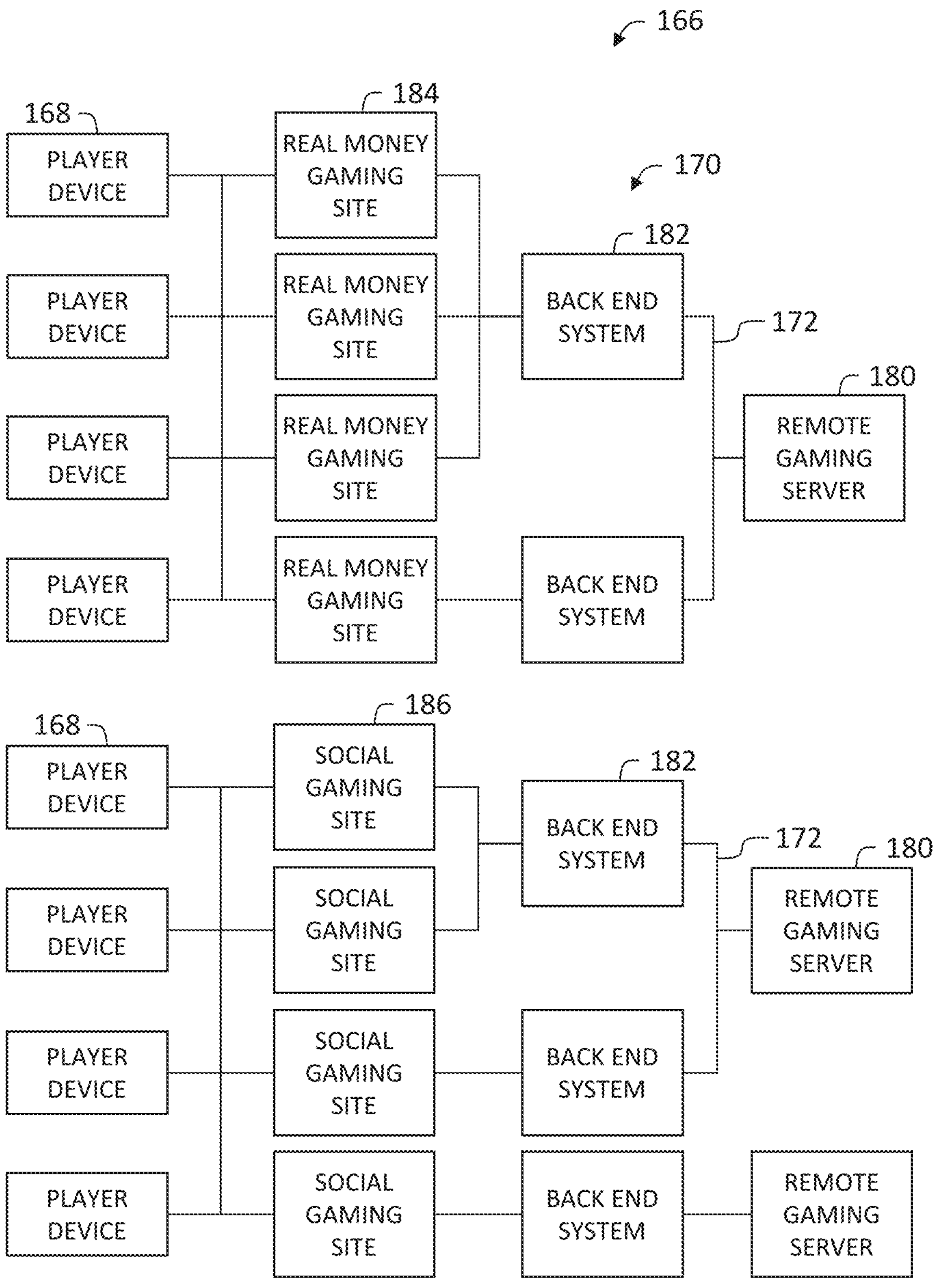
FIG. 11 is a functional block diagram of a server computer system, according to an embodiment of the present invention.
Figure 12:
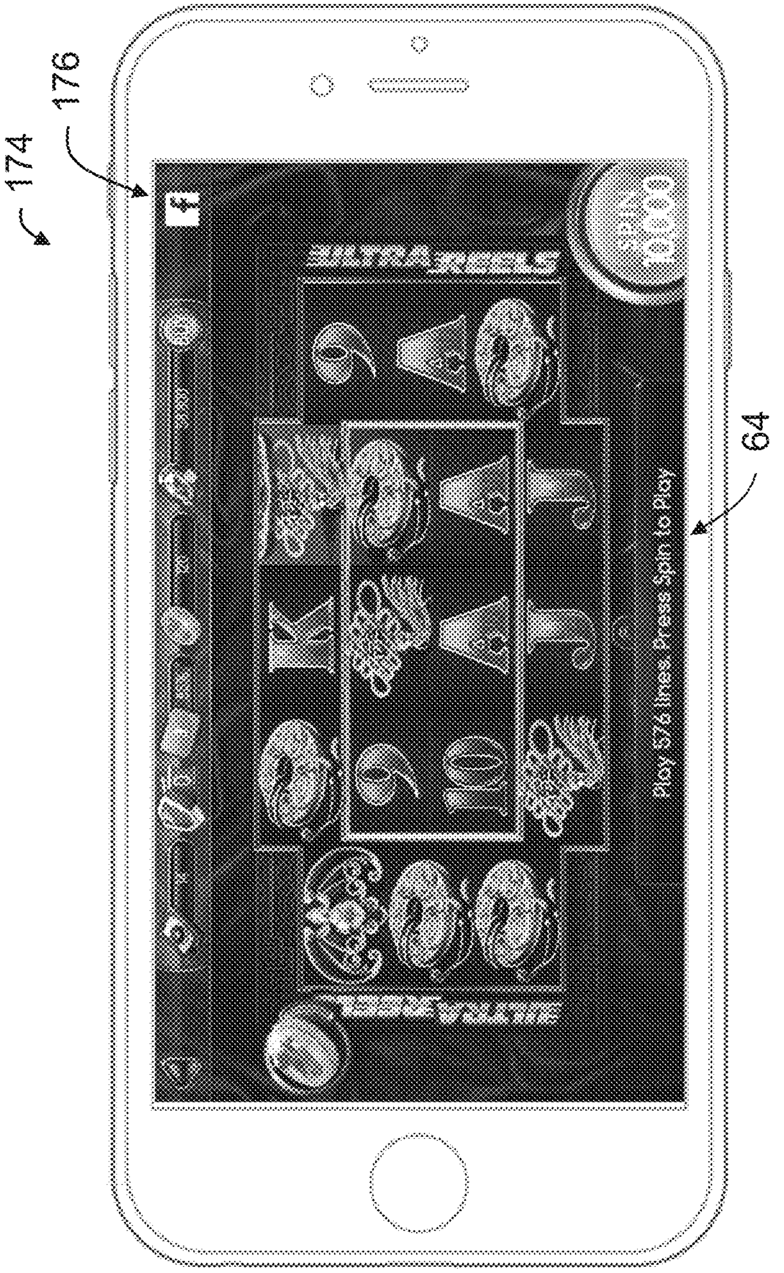
FIG. 12 is a front view of a mobile computing device that may be used with the server computer system of FIG. 7.

Referring to FIGS. 11 and 12, in one embodiment, the present inventions includes a networked server computer system 166 that is configured to deliver the game to one or more client computing devices 168 over the Internet. In the illustrated embodiment, the networked computer system 166 includes an iGaming server system 170 that is coupled in communication with one or more client computing devices 168 via a communications network 172. The communications network 172 may be any suitable connection, including the Internet, an Intranet, LAN, a virtual private network (VPN), cellular networks, etc . . . , and may utilize any suitable or combination of technologies including, but not limited to wired and wireless connections, always on connections, connections made periodically, and connections made as needed.

The client computing device 168 may include any suitable device that enables a user to access and communicate with the server system 170 including sending and/or receiving information to and from the server system 170 and displaying information received from the server system 170 to a user. In the illustrated embodiment, the client computing device 168 includes a processor coupled to a memory device. The memory device stores various programs and data that are executed by the processor for operating the client computing device 168. The client computing device 168 also includes an input device configured to receive operational inputs from the user, and a display device configured to display a graphical user interface. The input device and display device enable a user to interact with the server system 170 via the client computing device 168. For example, in one embodiment, the client computing device 168 may include, but is not limited to, a desktop computer, a laptop or notebook computer, a tablet computer, smartphone/tablet computer hybrid, a personal data assistant, a handheld mobile device including a cellular telephone, and the like. In one embodiment, the processor of the client computing device 168 may be programmed to function as the control unit 22 of the gaming machine 10.

In the illustrated embodiment, the client computing device may include a web browser program stored in the memory device. The processor executes the web browser program to display web pages on the display device that includes information received from the server system 170 to enable a user to interact with and operate the server system 170.

In one embodiment, the client computing device 168 includes a mobile computing device 174 (shown in FIG. 12) such as, for example, a tablet computer, a smartphone/tablet computer hybrid, a smartphone such as an iPhone™, and the like. The mobile computing device 174 includes a processor coupled to a memory device for storing various programs and data for use in operating the mobile computing device 174. The mobile computing device 174 may also include a touchscreen display unit 176, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 174 may also include a Wi-Fi antenna, a cellular network antenna, a Bluetooth™ communications device, assisted GPS and GLONASS, a digital compass, and an iBeacon™ microlocation device.

The mobile computing device 174 may be programmed to store and execute mobile computer program applications that display graphical user interfaces 178 on the touchscreen display unit 176 including display area 64 that allows the user to access the server system 170 to retrieve and store information within the server system 170 as well as interact with and operate the server system 170. In addition, in one embodiment, the server system 170 may install one or more mobile computer application programs in the memory device of the mobile computing device 174. When initiated by the processor of the mobile computing device 174, the mobile computer application program causes the processor of the mobile computing device 174 to perform some or all of the functions of the gaming machine 10.

In the illustrated embodiment, the server system 170 includes one or more remote gaming servers 180, one or more back-end servers 182, one or more real money gaming website hosting servers 184, and one or more social gaming website hosting servers 186. In the illustrated embodiment, the social gaming website hosting server 186 and the real money gaming website hosting server 184 are programmed to host a website that is accessible by a user via one or more client computing devices 168. The website hosting servers 184 and 186 execute a website application program that retrieves application code from the back-end server 182 and executes the application code to render one or more webpages on a display device of a client computing device 168 in response to requests received from the user via the client computing device 168 to allow users to interact with the website. The website hosting servers 184 and 186 are configured to generate and display webpages displaying a game. For example, the real money gaming website hosting server 184 is configured to host a real money wagering website that enables players to convert monetary funds to gaming credits that may be used to place wagers on the game. The social gaming website hosting server 186 is configured to host a social media and/or social gaming website that allows players to receive gaming credits for activities such as purchasing goods and/or services through an e-commerce website, and/or purchase gaming credits that may be used to play the game.

Each back-end server 182 is configured to perform operations to support the functions of the webpages and/or website being displayed by the website hosting servers 184 and 186. For example, in one embodiment, the back-end servers 182 may include a player account system server that is configured to generate player accounts that include data associated with a player including, but not limited to, player identification information, player financial account information, player gaming credit account information, and/or any suitable player information, that may be used to establish credit meters and allow players to place wagers on the game.

Each remote gaming server 180 includes one or more copies of the game application program 92 stored in a memory device of the remote gaming server 180. A processor of the remote gaming server 180 is programmed to retrieve and transmit the game application program 92 to one or more back-end servers 182 for use in displaying the game to the user via a webpage being displayed by the web browser program.

In one embodiment, the game application program 92 may include instructions for rendering the game and executing the game on the client computing device 168. For example, the game application program 92 may include instructions for generating rendered code, such as, for example HTML code, that may be used by the web browser program of the client computing device 168 for displaying the game. For example, the game application program 92 may include program software code including, but not limited to, HTML, JavaScript, cascade style sheets (CSS), and any suitable programming code that may be used for rendering and operating the game via a website and/or mobile computer application.

In one embodiment, upon receiving a request from the website hosting servers 184, 186 via the back-end server 182, the remote gaming server 180 may execute the game application program 92 to operate the game, and execute a render-to-string operation to generate rendered code indicative of the game, such as, for example HTML code, and transmit the rendered code to the back-end server 182. The back-end server 182 may then transmit the rendered code to the corresponding website hosting servers 184, 186 for use in displaying the game on the website. As the player plays the game, the remote gaming server 180 may execute the game application program 92 for each instance of the game, and transit rendered code to the back-end servers 182.

In another embodiment, the remote gaming server 180 may transmit the game application program 92 to the back-end server 182 and/or the website hosting servers 184, 186. The back-end server 182 and/or the website hosting servers 184, 186 may then execute the game application program 92 to initiate the instances of the game and execute render-to-string operations to generate rendered code indicative of the game.

In yet another embodiment, the back-end server 182 may receive a request to initiate the game from a mobile computing device 174 executing the mobile computer application program. Upon receiving the request, the back-end server 182 may access the game application program 92 and execute a render-to-string operation to generate rendered code indicative of the game and transmit the rendered code to the mobile computing device 174. In one embodiment, the back-end server 182 may continuously execute the game application program 92 to generate each instance of the game using a random number generator of the back-end server 182 based on input received from the mobile computing device 174 and generate and transmit rendered code for each instance of the game to the mobile computing device 174. In another embodiment, the back-end server 182 may execute a partial-render operation and generate partially-rendered code of the game using the game application program 92, and transmit the partially rendered code of the game and object data of game assets to the mobile computing device 174. The partially rendered code includes instructions for generating rendered code using the game assets and a random number generator of the mobile computing device for generating and displaying the game on the mobile computing device 174 using the mobile computer application program.

In one embodiment, the game application program 92 may be stored on several different servers. The game code on these servers is used to distribute game content to social or real money gaming websites and mobile applications. The distribution method is very flexible. For example, the game code and/or game application program 92 including game code and game object assets may be stored on a remote gaming server 180. One remote gaming server 180 may be connected to one or more back-end server 182.

Each back-end server 182 is configured to distribute the games to one or more websites or mobile applications. Players connect to these websites/mobile applications with the client devices or mobile devices and have access to the game content. A copy of game application program 92 including game code and game object assets is stored on the remote gaming server 180 for each back-end server 182 that is connected to the remote gaming server 180 and that distributes the game. For example, if one remote gaming server 180 is connected to two back-end servers 182, which is connected to three website hosting servers 184, 186 that distribute the game, the remote gaming server 180 would store two copies of the game application program 92 including game code and game object assets for the game (e.g. one copy for each back-end server 182).

For example, the server system 170 may be configured to implement the game on a mobile application such as, for example, "my KONAMI Slots™" mobile application available in Apple iOS™, Google Android™, and Amazon Kindle™ operating platforms, or on social-media websites such as the "my KONAMI Slots™" available on Facebook™. In one embodiment, the mobile application may download the game code from remote gaming server 180 via the real money gaming site 184 or the social gaming site 186 and execute the game code on the client computing device 168. In this embodiment, the game code may provide game specific/front-end function when executed by the processor of the client computing device, and the back end system 182 may provide generic/back-end function.

Figure 18:
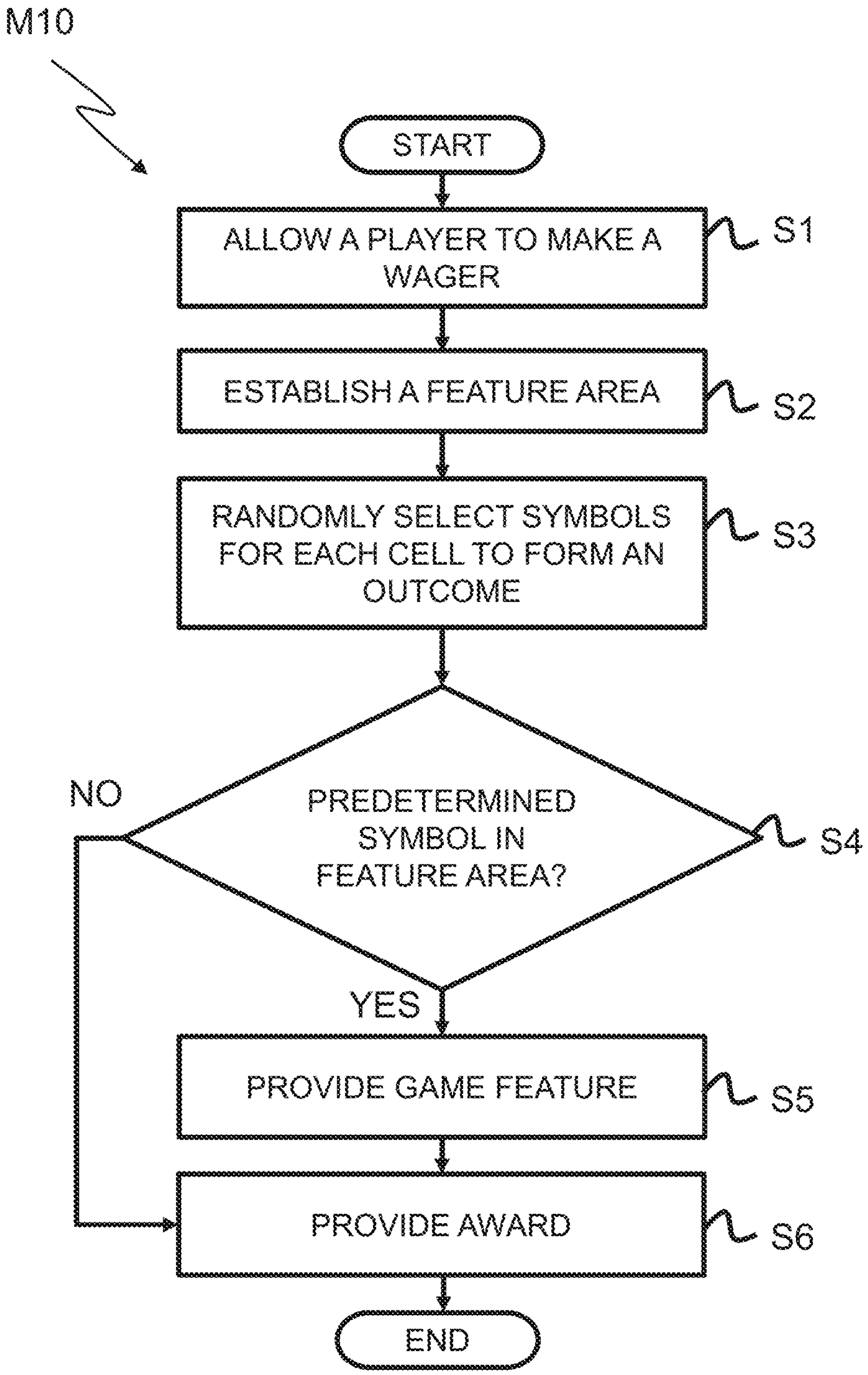
FIG. 18 is a flow chart illustrating the algorithms used during operation of the gaming machine during a game, according to one embodiment of the present invention.
Figure 23:
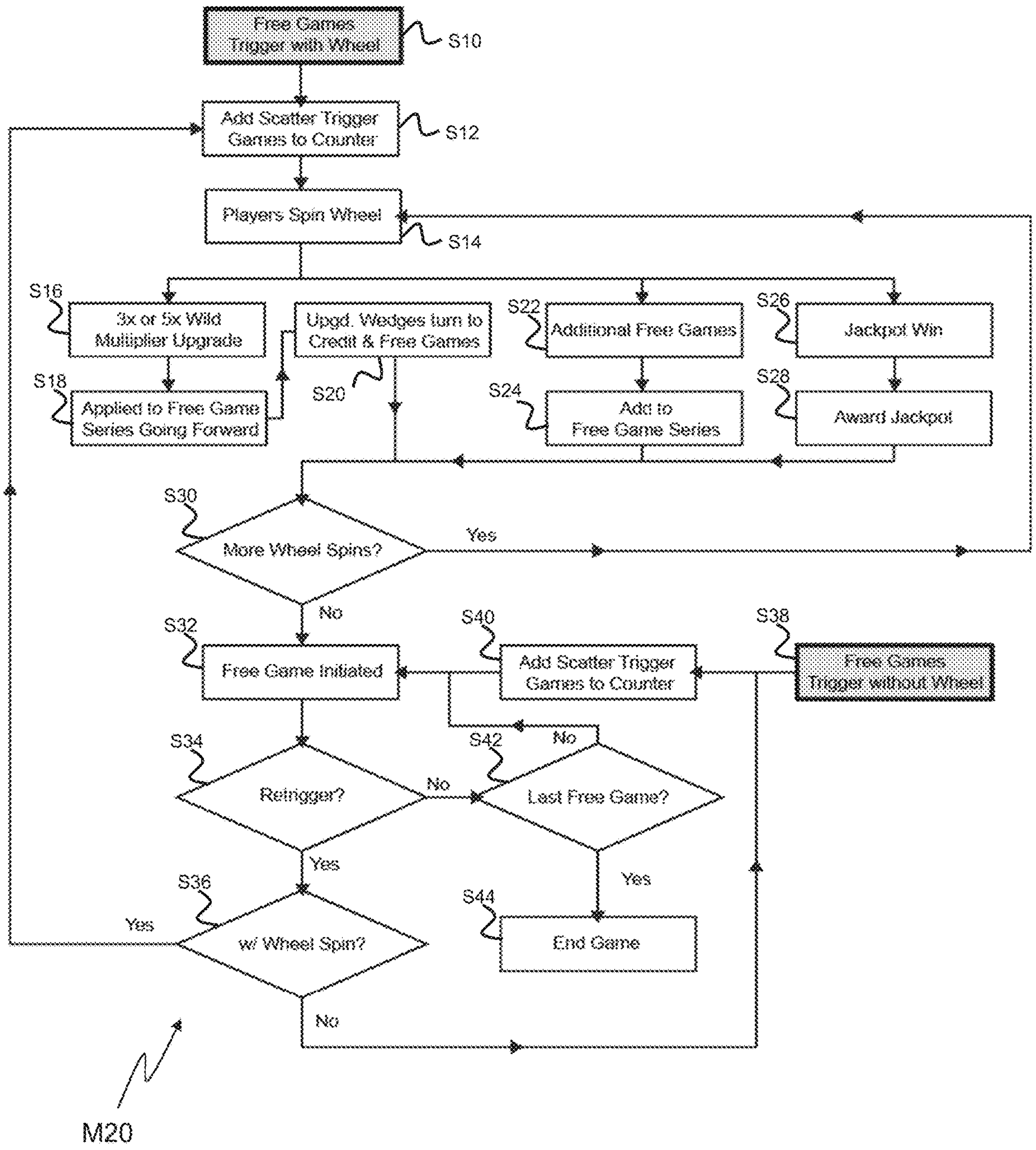
FIG. 23 is a flow chart illustrating the algorithms used during operation of the gaming machine during a game, according to one embodiment of the present invention.

FIGS. 18 and 23 are flow charts of methods M10 and M20 illustrating the algorithms included in the game application program 92 and performed by the processor 38 when executing the game application program 92 for operating the gaming machine 10 and/or iGaming server system 170 to implement the game. The methods include a plurality of steps. Each method step may be performed independently of, or in combination with, other method steps. Portions of the methods may be performed by any one of, or any combination of, the components of the gaming machine 10 and/or iGaming server system 170. FIGS. 19A-22B and 26A-26B are diagrammatic illustrations of a game being displayed on the display area of the gaming machine in FIGS. 1A-1B and the mobile computer device shown in FIG. 12, according to an embodiment of the present invention.

The gaming machine 10 of the present embodiment provides a primary game (also referred to as a main game) and a game feature. The game feature may include one or more of (1) a multiplier applied to an award or payline, (2) an award of a predetermined number of credits, (3) a number of free games or spins, and/or (4) a bonus game. Generally, the game feature is provided when predetermined conditions, i.e., a triggering condition, are satisfied. Concerning a primary game (and any frees spins), the symbols displayed in the display area 64 configure a combination of symbols that are the result of a game, and determine a win.

In one embodiment of the present invention, the gaming machine 10 includes the operation unit 32, a display unit 24 and a control unit 22. The operation unit 32 is configured to receive an operation of a player (see above). The display unit 24 is operably coupled to the operation unit 32 and is configured to display a symbol display area 64. The symbol display area 64 includes a plurality of cells 70 arranged in a grid 68. As discussed above, the grid 68 has a plurality of rows and a plurality of columns.

The control unit 22 is operably coupled to the operation unit 32 and the display unit 24 and is configured to initiate a game in response to player operation and to establish an outcome of the game. The control unit 22, in response to initiation of the game, being randomly selects a plurality of symbols associated with the symbol display area 64 or grid 68. Each symbol in the plurality of symbols is associated with one of the plurality of cells 70 in the grid 68. The plurality of symbols forms the outcome of the primary game.

In some embodiments, each symbol in the outcome of the primary game may be randomly selected. In the illustrated embodiment, the game is a video slot game. As discussed above, each column has an associated reel strip. In randomly selecting the symbols, the control unit 22 randomly determines a stop position (using a random number generator or RNG) for each reel strip and displays the outcome in a manner to simulate rotating reels. The symbol in each column in the outcome is a function of the associated reel strip and the randomly determined stop position.

As discussed in more depth below, the control unit 22 may establish the establishment of a feature area as a group of the cells 70. The feature area may be utilized in establishing whether a trigger condition has occurred (see below).

In the display area 64, a pay line is set that is used when winning is determined. The pay line is set to be extended over the column on the right end from the cells of the column of the left end, and is a line that combines the plurality of cells 70 determining a win. The number of effective lines within the set pay line is selected by the operation of a group of line designation buttons included in the group of setting buttons 34 of the operation unit 32 for the player. The control unit 22, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 64 is set (see FIG. 6). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line. In addition, more than predetermined number of the "Sctr" and/or "SpSctr" form win combination or trigger condition regardless of the pay line.

The control unit 22 determines if a trigger condition has occurred during the primary game. If the trigger condition has occurred, then the game feature is provided.

In one aspect of the present invention, the trigger condition is defined as the appearance on a predetermined number of one of a predetermined one of the symbols in a feature area 69 of the grid. The feature area 69 is defined a predefined subset of the cells 70 of the grid 68. The subset may include less than or all of the cells 70 of the grid 68.

The control unit 22 establishes one of a plurality of predefined subsets of the cells 70 as the feature area 69. In one embodiment, the feature area 69 is established as a function of the wager made by the player. The control unit 22 provides a game in response to player operation. The control unit 22, in providing the game, randomly selects a plurality of symbols associated with the display area 64. Each symbol in the plurality of symbols being associated with one of the plurality of cells 70 in the grid 68. The plurality of symbols forms an outcome of the game. An award may be awarded to the player as a function of the outcome of the game and a pay table.

In one embodiment, the control unit 22 is configured to detect an occurrence of a predetermined symbol, e.g., the Scatter symbol in the feature area 69 and to responsively provide a game feature as a function of the occurrence of the predetermined symbol in the feature area 69. As discussed above, the control unit or game control unit 22 executes the game. In one embodiment, in executing the game, the game control unit 22 includes the processor 38 which is programmed to display the game screen or display area 64 on the display unit 24, display a default one of the plurality of predefined subset of the cells on the game screen 64, allow the player to select another one of the plurality of predefined subsets of the cells using the operation unit 32 and responsively receive a signal from the operation unit 32 indicating a selection, by the player, of one of the plurality of predefined subsets of the cells. The processor 38 of the game control unit is programmed to responsively display the selected predefined subset of the cells on the game screen 64 in response to receiving the signal provide an instance of the game using the feature area 69, where the feature is one of (1) the default predefined subset of the cells and (2) the selected predefined subset of the cells if the player selects another one of the plurality of predefined subsets of the cells. The processor 38 of the game control unit, in providing the instance of the game, is programmed to randomly select a plurality of symbols associated with the game screen 64. Each symbol in the plurality of symbols being associated with one of the plurality of cells 70 in the grid 68. The plurality of symbols forms an outcome of the game. The processor 38 of the game control unit is programmed to detect an occurrence of a predetermined symbol in the feature area and responsively provide a game feature as a function of the occurrence of the predetermined symbol in the feature area.

Figure 17A:
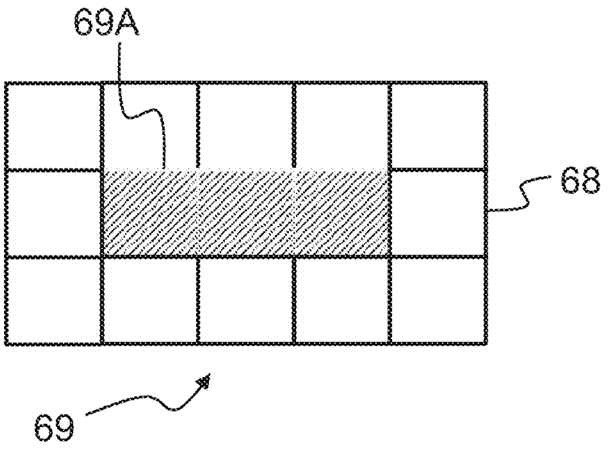
FIGS. 17A-17D are diagrammatic illustrations of the display area and/or operation unit of the gaming machine in FIG. 1, according to an embodiment of the present invention.
Figure 17B:
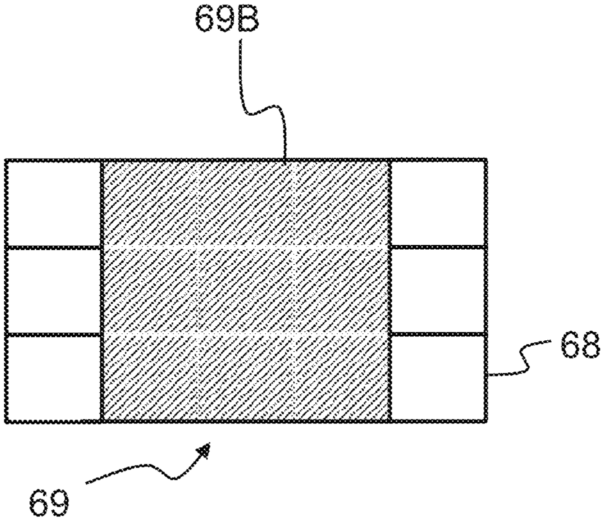

With reference to FIGS. 17A and 17B, each one of the predefined subsets 61 of the cells 70 includes an associated number of cells. In the illustrated embodiment, the subsets of cells 70 include a first subset of cells 69A and a second subset of cells 69B. The associated number of cells in the second subset of cells 69B is greater than the associated number of cells in the first subset of cells 69A. As shown, in the illustrated embodiment, the first subset of cells 69A includes three cells and the second subset of cells 69B includes nine cells. Each subset of cells 61 requires an associated minimum wager. The associated minimum wager of the second subset of cells 69B is greater than the associated minimum wager of the first subset of cells 69A.

Figure 17C:
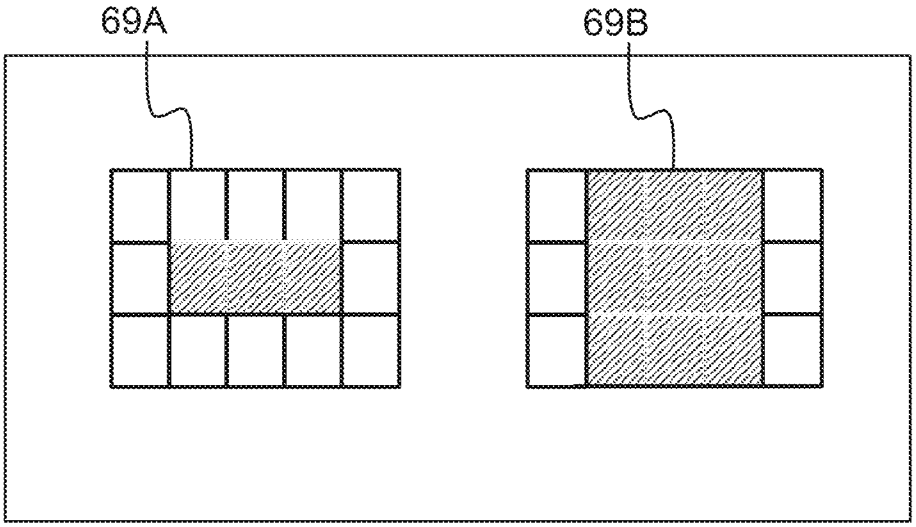

With reference to FIG. 17C, in one embodiment the player may select to play either the first subset of cells 69A or the second subset of cells 69B. In general, before an instance of the game is initiated, the player may make a wager. The selection of one of the subsets 69A, 69B will affect the wager. In some instances, the player may select the number of paylines to player and/or the number of credits to play on each payline. The default subset is the first subset of cells 69A. Thus, the first subset of cells 69A are highlighted on the grid 68 on the game screen or display area 64. For example, the cells in the first subset of cells 69A may be highlighted using a different color border. The player may be presented with the option to change the subset of cells to be utilized. As shown in FIG. 17C, in one embodiment the player may be presented with the available subsets on the display area 64. The display area 64 may include a touchscreen input device that allows the player to select one of the subsets 69A, 69B. Alternatively, the player may select one of the subsets 69A 69B using the operation unit 32. If the player selects the second subset of cells 69B, the cells in the second subset 69B may be highlighted on the grid 68 on the game screen or display area 64. The default subset is generally the first subset 69A. If the player selects the second subset 69B, then the player's actual wager will increase accordingly. In one embodiment, the player's wager if the second subset 69B is selected is 2× the total bet.

Figure 17D:
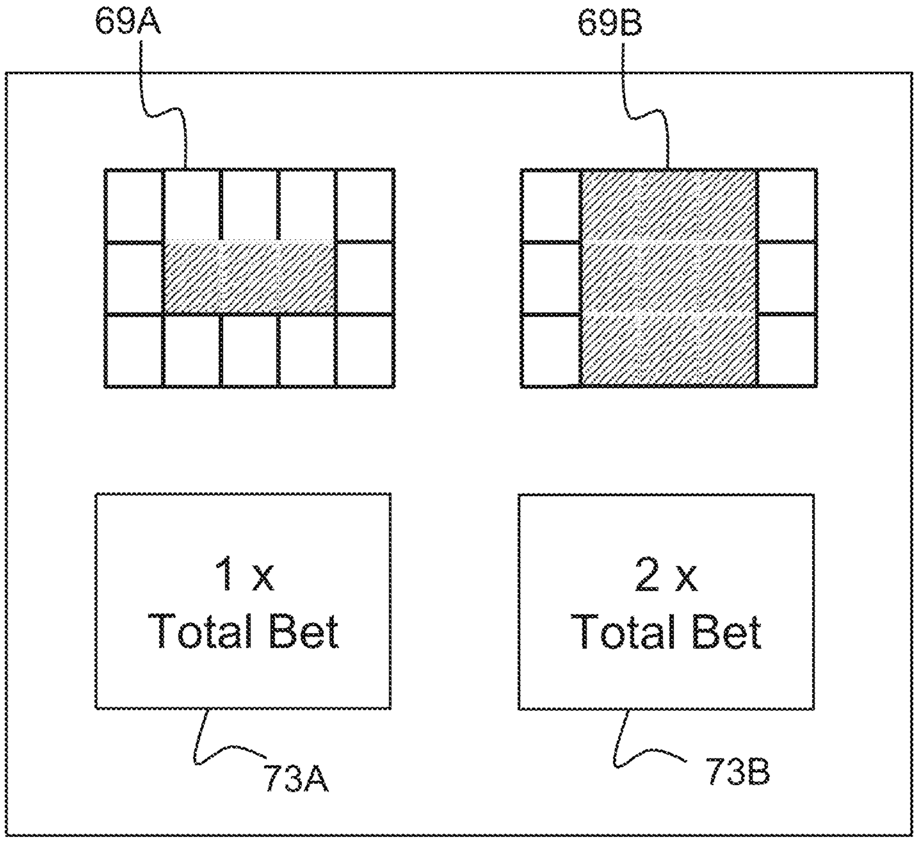

With reference to FIG. 17D, the player may select the subset 69A, 69B by selecting the actual wager. Once the player's paylines and bet per payline have been established, the player may be presented with wagering buttons 73A 73D. Selection of the wagering buttons 73A, 73B selects the corresponding subset 69A, 69B. The wagering buttons 73A, 73D may be implemented using the touchscreen device on the display area 64 and/or the operation unit 32.

In other embodiments, the subsets of the cells 70 may be based on the cells 70 in the columns of the grid 68. As discussed further below, a first subset of cells may include the cells 70 in a first column. A second subset of cells may include the cells 70 in the first column and a second column, and so on.

As discussed above, in one embodiment the game is a video slot game. The grid 68 has a plurality of columns. Each column defines a reel of the video slot game. The control unit 22 is configured to select a plurality of symbols to display symbols in the cells of the grid 68 in a manner to simulate rotating reels. The plurality of symbols being displayed in the cells of the grid 68 when the simulated rotating reels are stopped.

In other embodiments, the game feature may include the award of a predetermined number of credits is a predetermined symbol appears in the feature area. For example, the symbol set may include one or more symbols associated with a specific credit amount. If the symbol associated with a credit amount appears in the feature award, the player may be automatically awarded the associated credit amount. Further, any symbol associated with a credit amount that appears in the feature award may be copied or "nudged" into the other cells 70 in the same column. In some embodiment, this nudge feature may only be provided during free spins.

In one embodiment, the game feature includes a multiplier applied to the award. The predetermined symbol may be a wild symbol. In one embodiment, each occurrence of the wild symbol in the feature area has an associated multiplier. The associated multiplier of each occurrence of the wild symbol are multiplied together and applied to the award.

In another aspect of the present invention, the game feature includes a number of free games (or spins). The predetermined symbol may be the scatter symbol. The game feature is triggered if a predetermined number of occurrences of the scatter symbol appear in the feature area 69. The number of free games may be predetermined, randomly determined and/or determined as a function of the number of occurrences of the scatter symbol in the feature area.

In still another aspect of the present invention, the game feature is a bonus game (see below).

With reference to FIG. 18, in another aspect of the present invention, a control method M10 providing a game to a player using a gaming machine 10. The gaming machine 10 including an operation unit 32, a display unit 28, and a control unit 22. The operation unit 32 is configured to receive an operation of a player. The display unit 28 is operably configured to display a display area 64. The display area 64 includes a plurality of cells 70 arranged in a grid 68. The control unit 22 is operably coupled to the operation unit 32 and the display unit 28 and provides a game in response to player operation.

In a first step S1, the player is allowed to make a wager. In a second step S2, one of a plurality of predefined subsets 69A, 69B of the cells 70 is established as a feature area 69 as a function of the wager. In a third step S3, a plurality of symbols associated with the display area 64 are randomly determined. Each symbol in the plurality of symbols is associated with one of the plurality of cells 70 in the grid 68. The plurality of symbols forms an outcome of the game. In a fourth step S4, if an occurrence of a predetermined symbol in the feature area 69 is detected, then the method M10 proceeds to a fifth step S5. Otherwise, the method M10 proceeds to a sixth step S6. In the fifth step S5, the game feature is provided as a function of the occurrence of the predetermined symbol in the feature area 69. In the sixth step S6, an award is paid to the player as a function of the outcome of the game and a pay table.

In one embodiment the trigger condition is the appearance of a predetermined symbol or symbols in the feature area 69. The predetermined symbol may be randomly determined (the randomly determined symbol might be shown or not shown to the player). In one embodiment, one or more of the different types of game features may be provided during the same game. Different symbols may be used to trigger different ones of the game features. Or multiple game features may be triggered using the same trigger condition or triggering symbols.

In some embodiments of the present invention, the virtual reel strip 72-80 stop in a predetermined order, for example, from left to right.

In some embodiments of the present invention, the grid 68 is rectangular with the same number of rows across all columns and the same number of columns across all rows. The number of rows may be odd or even. The number of columns may be odd or even. For example, in one embodiment, the grid 68 may include fifteen cells 70 disposed in a grid shape of three rows and five columns.

In another embodiment, the number of rows per column may not be the same and/or the number of columns per row may not be the same. With reference to FIGS. 19A-19G and 22A-22B, in a second illustrated embodiment is shown. In the second illustrated embodiment, the grid 68 includes five columns. However, each of the first and fifth columns include three rows, while the second through fourth columns include four rows. Such as grid may be referred to as a 3-4-4-4-3 grid.

Figure 19A:
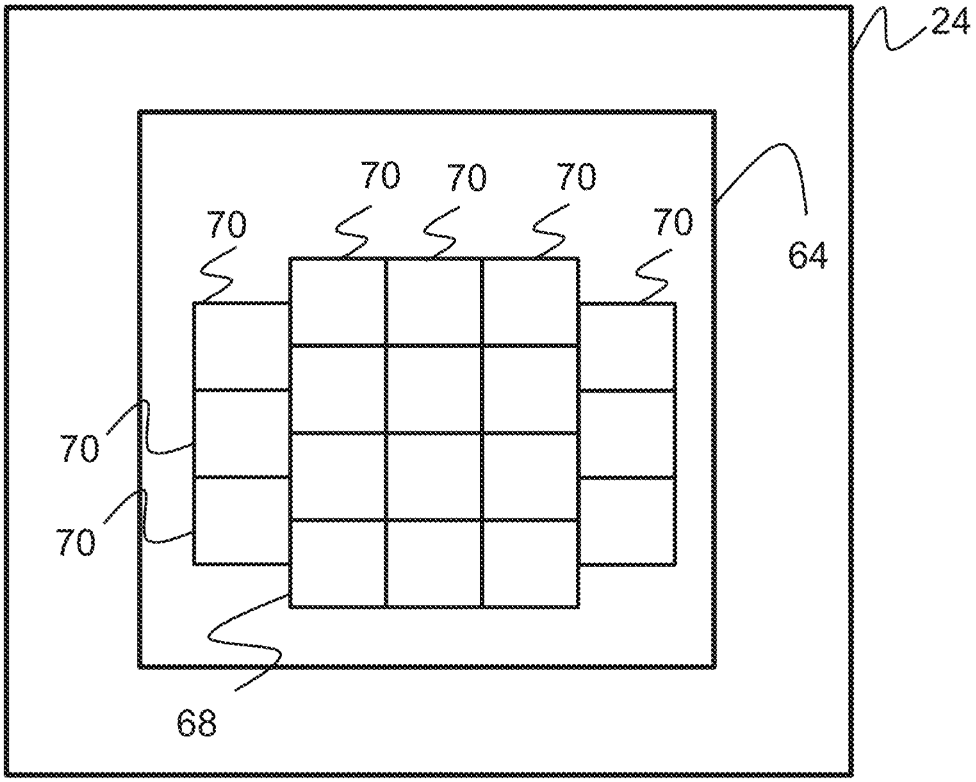
FIGS. 19A-19C are diagrammatic illustrations of a display area and/or operation unit of the gaming machine in FIG. 1, according to another embodiment of the present invention.
Figure 19B:
Figure 19C:

In the illustrated embodiment, the grid 68 is utilized for the primary game and may be utilized for the game feature. In the next several embodiments, the present invention will be described with respect to a 3-4-4-4-3 grid, however, it should be noted that the present invention is not limited to a grid with any specific size and/or shape. Furthermore, the below discussion describes a game having a primary game and a game feature. The game feature may provide a plurality of free games and/or spins. The free games and/or spins may utilize the 3-4-4-4-3 grid. A first exemplary screenshot of the grid 68 is shown in FIG. 19B and a second exemplary screenshot of the grid is shown in FIG. 19C.

The second illustrated embodiment provides a game. The game contains a free game and wheel game feature (the wheel feature being nested inside the free game trigger). The bonus game is triggered by 3, 4 or 5 trigger symbols, where when triggered, players receive 7, 12 or 20 free games, respectively. If any trigger symbols land in the feature area on the primary game screen, players also receive up 1, 2 or 3 spins of a bonus prize wheel prior to initiating the free game feature.

The symbols are “9”, “10”, “J”, “Q”, “K”, “A”, “PIC-d”, “PIC-c”, “PIC-b”, “PIC-a”, “Wild”, “Sctr” and “SpSctr”. The Wild symbol substitutes for all symbols except for Sctr or SpSctr. The wild symbols only appear on reels 2, 3 and 4. All of the other remaining symbols have the possibility to appear on every reel. All wins pay from the left most reel to the right in any positions on adjacent reels. In one embodiment, the “SpSctr” only appears in place of “Sctr” when the “Sctr” is to appear in the feature area of the game outcome.

During the free games, the second, third, and fourth reels each contain a number of positions that are randomly replaced with one of the following symbols: 9", “10”, “J”, “Q”, “K”, “A”, “PIC-d”, “PIC-c”, “PIC-b”, “PIC-a”, “Wild” and “Set”.

With reference to FIGS. 20A-20E, in the second illustrated embodiment, the set of possible feature areas includes first, second, third, fourth and fifth feature areas 71A, 71B, 71C, 71D, 71E. As shown, the first, second, third, fourth and fifth feature areas 71A, 71B, 71C, 71D, 71E includes two, four, six, nine, and twelve cells, respectively. In the illustrated embodiment, the player may select, via the operation unit 32, one of the feature areas 71A, 71B, 71C, 71D, 71E. Each feature area first, second, third, fourth and fifth feature areas 71A, 71B, 71C, 71D, 71E. requires a minimum bet or wager. The player is allowed to bet the minimum or a multiple of the minimum bet (up to 5× the minimal bet). In one embodiment, the selected/established feature area is used in the primary game and any resulting free games or spins.

For example, in the second illustrated embodiment, the following bets or wagers (in credits) are allowed:

| Feature Area | Minimum Bet (Min. Bet × 1) | Max Bet (Min. Bet × 5) |
|---|---|---|
| First | 50 | 250 |
| Second | 75 | 375 |
| Third | 100 | 500 |
| Fourth | 150 | 750 |
| Fifth | 200 | 1,000 |

It should be noted that in the illustrated embodiments, the player can also bet: (1) 2× minimum bet, (2) 3× minimum bet, and (3) 4× minimum bet. Once the player has selected his wager, the control unit 22 establishes the associated feature area as the feature area to be used in the game.

Figure 20A:
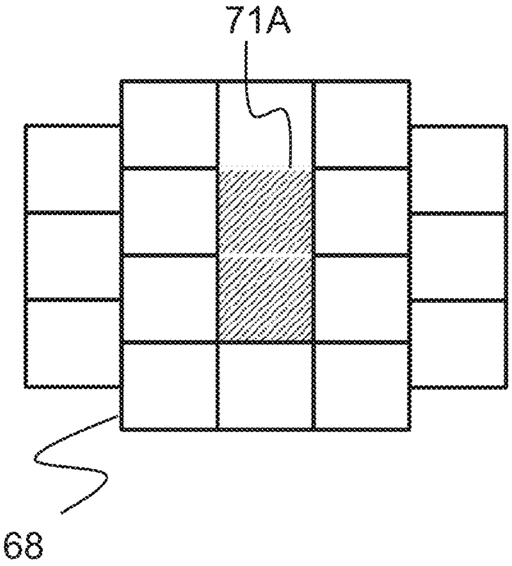
FIGS. 20A-20G are first, second, third, fourth, and fifth diagrammatic illustrations of a display area of the gaming machine in FIG. 1, according to the another embodiment of the present invention.
Figure 20B:
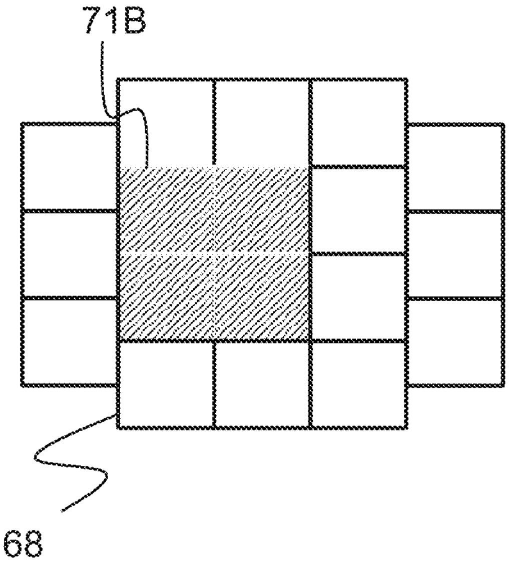
Figure 20C:
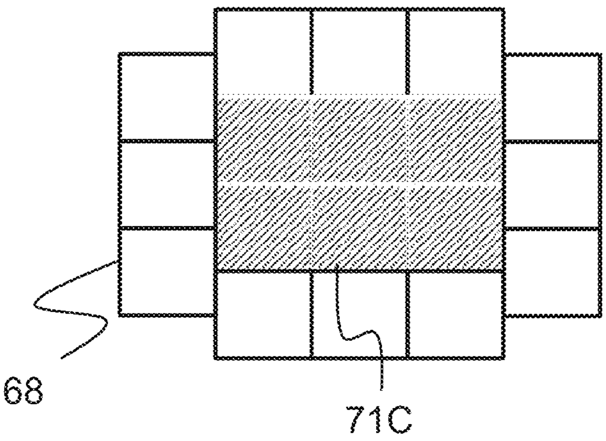
Figure 20D:
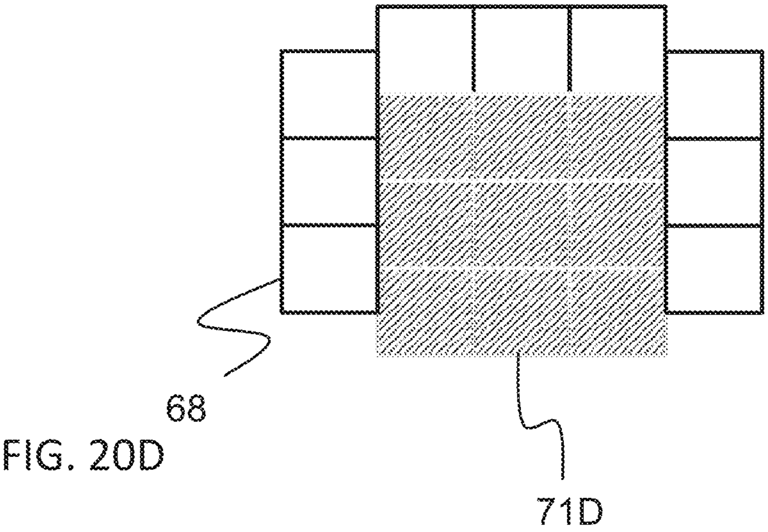
Figure 20E:
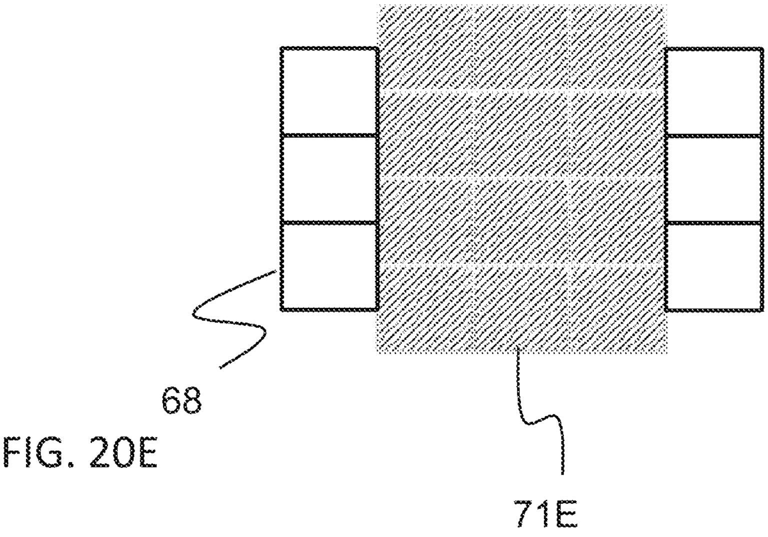
Figure 20F:
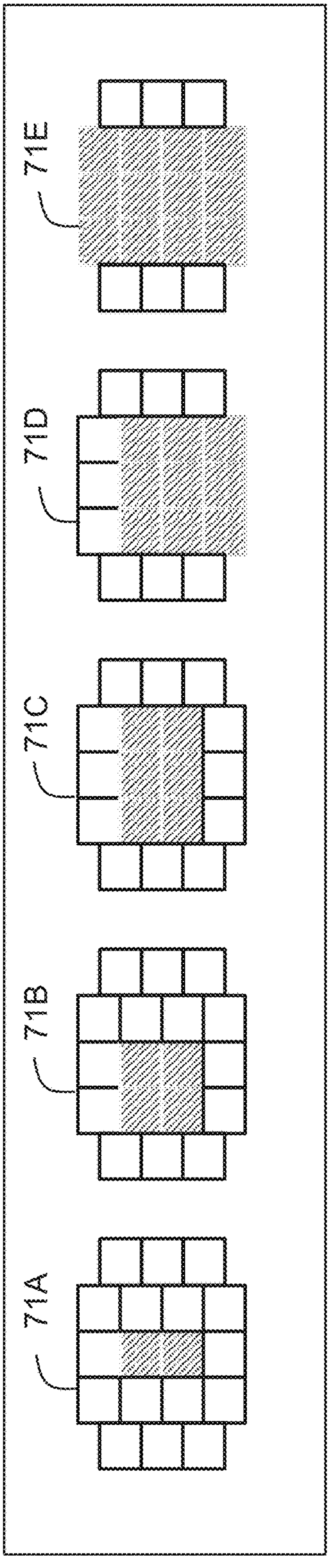
Figure 20G:
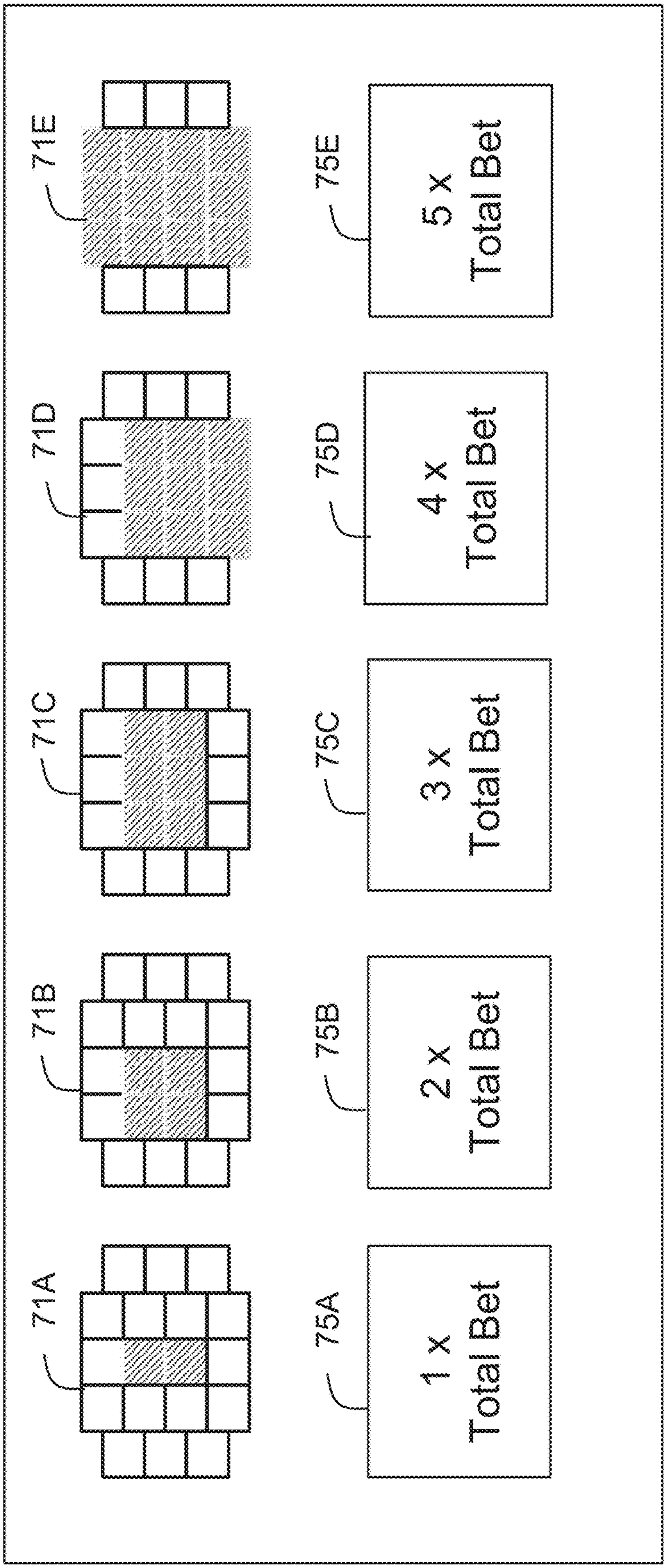

With reference to FIG. 20F, in one embodiment the player may select to play one of the first, second, third, fourth and fifth subsets or feature areas 71A, 71B, 71C, 71D, 71E. In general, before an instance of the game is initiated, the player may make a wager. The selection of one of the feature areas 71A, 71B, 71C, 71D, 71E will affect the wager. In some instances, the player may select the number of paylines to player and/or the number of credits to play on each payline. The default subset is the first feature area 71A. Thus, the first feature area 71A is highlighted on the grid 68 on the game screen or display area 64. For example, the cells in the first feature area 71A may be highlighted using a different color border. The player may be presented with the option to change the subset of cells to be utilized. As shown in FIG. 20F, in one embodiment the player may be presented with the available feature areas on the display area 64. The display area 64 may include a touchscreen input device that allows the player to select one of the feature areas 71A, 71B, 71C, 71D, 71E. Alternatively, the player may select one of the feature areas 71A, 71B, 71C, 71D, 71E using the operation unit 32. If the player selects the second feature area 71B, the cells in the second feature area 71B may be highlighted on the grid 68 on the game screen or display area 64. The default subset is generally the first feature area 71A. If the player selects the second feature area 71B, then the player's actual wager will increase accordingly. In one embodiment, the player's wager if the second subset 69B is selected is 2× the total bet.

With reference to FIG. 17D, the player may select one of the feature areas 71A, 71B, 71C, 71D, 71E subset 69A, 69B by selecting the actual wager. Once the player's paylines and bet per payline have been established, the player may be presented with wagering buttons 75A, 75B, 75C, 75D, 75E. Selection of the wagering buttons 75A, 75B, 75C, 75D, 75E selects the corresponding feature area 71A, 71B, 71C, 71D, 71E. The wagering buttons 71A, 71B, 71C, 71D, 71E may be implemented using the touchscreen device on the display area 64 and/or the operation unit 32.

Figure 21:
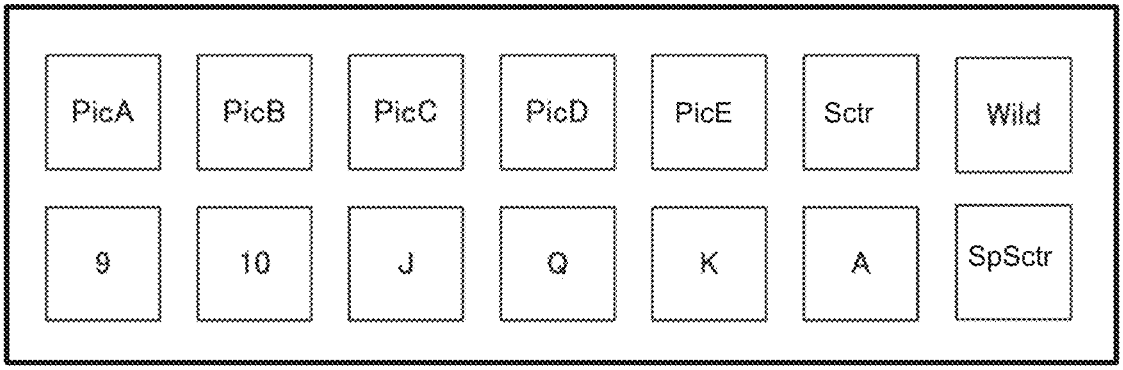
FIG. 21 is a figure showing the symbols displayed on the display area, according to a second embodiment of the present invention.
Figure 22A:
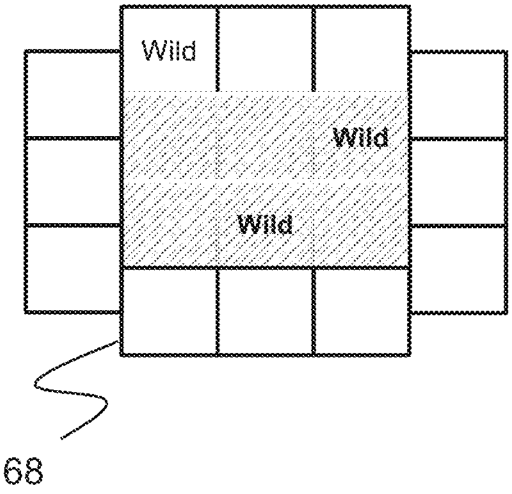
FIGS. 22A-22B are first and second diagrammatic illustrations of a display area of the gaming machine in FIG. 1, according to the second embodiment of the present invention.
Figure 22B:
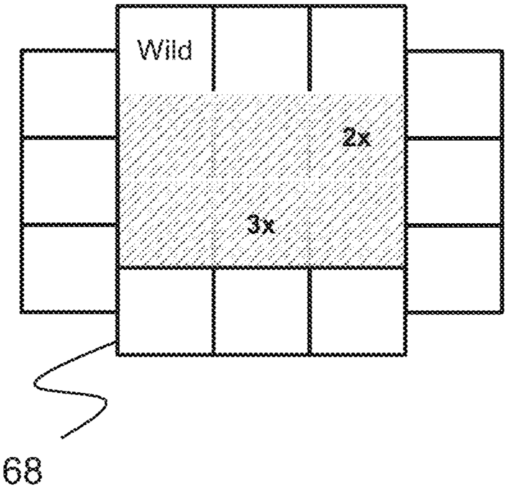

As discussed in more detail below, the second illustrated embodiment includes several game features. The game in the second illustrated embodiment utilizes the established (or selected) feature area to provide features that are affected by any wild or scatter symbol that appear therein. With reference to FIG. 21, in the second illustrated embodiment, the symbol set includes a scatter symbol ("Sctr") and a special scatter symbol (SpSctr). The full set of symbols that may be used includes: "9", "10", "J", "Q", "K", "A", "PIC-d", "PIC-c", "PIC-b", "PIC-a", "Wild", "Sctr" and "SpSctr".

The game features involving the established feature area in the second illustrated embodiment include: (1) a wild enhancement multiplier feature, (2) a free game feature, and (3) a wheel feature. In the second illustrated embodiment, the wheel feature may only be triggered when the free game feature is triggered. However, the present invention is not limited to such an embodiment. The game features involving the established feature area will be discuss in more detail below.

The wild enhancement multiplier feature may be provided during the primary game and/or any free spins. In the outcome of a primary game or a free spin, when one or more wild symbols appear in the established feature area, a multiplier appears on each wild symbol appearing in the feature area 69. For example, with reference to FIG. 22A, a wild symbol appears outside of the feature area and two wild symbols appear in the feature area 69. The two wild symbols appearing within the feature area 69 are respectively replaced with wild symbols having either multipliers of 2× or multiplier of 3×, randomly. The multipliers are multiplicative. Thus, in the example of FIG. 22B, a multiplier of 6× is used on a win combination including both of the multipliers.

The free game feature is triggered (during a primary game or a free spin) if three, four, or five scatter symbols or special scatter symbol appears in the outcome. In one embodiment, the triggering scatter symbols may appear anywhere in the outcome, i.e., in or out of the feature area. In another embodiment, the triggering scatter symbols must appear within the feature area. In the second illustrated embodiment, seven, twelve, and twenty free games are awarded in response to three, four, and five scatter or special scatter symbols appearing in the outcome, respectively. However, it should be note that the present invention is not limited to a specific number of free games being awarded.

During the free games or spins, the second, third and fourth reel strips each contain a number of positions that are randomly replaced with one of the following symbols: "9", "10", "J", "Q", "K", "A", "PIC-d", "PIC-c", "PIC-b", "PIC-a", "Wild" and "Sctr". The replacement may occur before the spin is initiated and all replacement positions are filled with the same random symbol.

In the second illustrated embodiment, the wheel feature is triggered, only if free game feature has been triggered, and if at least one special scatter ("SpSctr") symbol appears. In one embodiment, the SpSctr symbol(s) must appear in the feature area. In another embodiment, the SpSctr symbol(s) may appear anywhere in the outcome of the primary game or free game.

As discussed in more detail below, the wheel feature includes a spin of a wheel (see below) for each SpSctr symbol. The wheel includes a number of awards that may be awarded to the player. In one aspect of the second illustrated embodiment, the player may initiate the spinning of the wheel through actuation of a spin button. Otherwise, after a predetermined period of time, the wheel will start spinning.

In one embodiment, the wheel feature is activated before the free spins. The possible awards on the wheel may include:

- credit prizes;
- additional free games, e.g., three, five, eight or fifteen games;
- a 3× or 5× wild multiplier upgrade applied to all wilds appearing in the feature area during free games;
- if the wild multiplier upgrade is awarded, then the 3× or 5× wild upgrade wedges on the wheel may change to a different award in later wheel feature which was triggered at the same time, for example, an additional free games award or additional credit award.

Figure 24A:
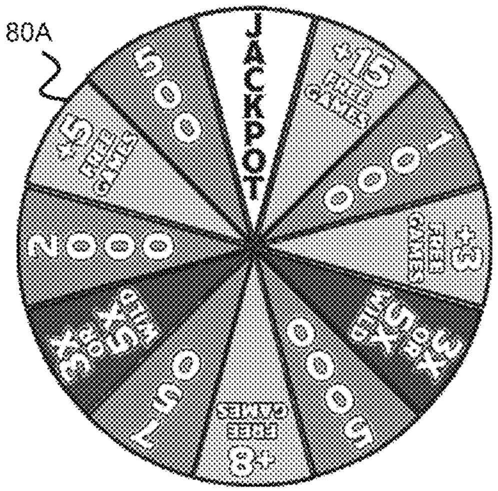
FIGS. 24A and 24B are diagrammatic illustrations of a wheel utilized in a wheel feature of the second embodiment.
Figure 24B:
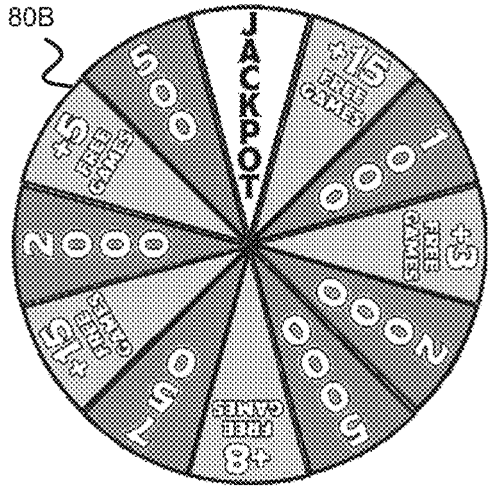

With reference to FIG. 23, a method M20 related to the free games feature and the wheel feature is shown. In a first step S10, during the primary game, a plurality of free games and at least one spin of the wheel are awarded to the player (during the main game). Exemplary wheels are shown in FIGS. 24A and 24B. The wheel feature may be displayed in the upper display 22 and/or the lower display 24. During each spin of the wheel, the wheel rotates and one of the slices or wedges on the wheel is randomly determined. The wheel is stopped such that the randomly determined wedges is located under or adjacent a pointer (not shown). In a second step S12, the number of free games awarded to the player are added to a free game counter.

In a third step S14, the player initiates the spinning of the wheel. As noted above, if the player does not initiate the spinning of the wheel in a predetermined period of time, then the wheel begins to spin automatically.

With reference to FIG. 24A, at the beginning of the wheel feature, an initial wheel 80A is used. The initial wheel 80A has twelve wedges. Five of the wedges have an associated credit amount (500, 1000, 5000, 750, and 2000 credits, respectively). Four of the wedges have a number of additional free games (15, 3, 8, and 5 free games). Two of the wedges have an associated wild multiplier. In the illustrated embodiment, the associated multiplier is 3× or 5×. The last wedge is a jackpot wedge. The jackpot wedge has an associated, fixed number of credits, e.g., 100,000.

After wheel begins to spin and stops to indicate the randomly determined wedge.

If one of the wild multiplier upgrade wedges is selected, then the method proceeds to a fourth step S16. In a fifth step S18, 3× or 5× multiplier is applied to the wild feature in the following free games (see above). In a sixth step S20, the wild upgrade wedges are modified into one of an additional free game wedge, e.g., +15 free games) and an additional credit wedge, e.g., 2,000. This creates a modified wheel, as secondary wheel 80B, as shown in FIG. 14B. The secondary wheel 80B is used for any subsequent wheel spins.

Returning to the third step S14, after the wheel stops spinning, if one of the additional free games wedges has been selected in a seventh step S22, the method M20 proceeds to an eighth step S24. In the eighth step, the additional free games, e.g., +3, +8, +5, or +15, are added to the previous total of free games.

Returning to the third step S14, after the wheel stops spinning, if the jackpot win wedge has been selected in a ninth step S26, then the jackpot is awarded to the player in a tenth step S28. After the sixth, eighth or tenth steps S20, S24, S28, the method M20 proceeds to an eleventh step S30. In the eleventh step S30, the wheel spin counter is decremented. If there are additional wheel spins, then the method M20 returns to the third step S14. Otherwise, the method M20 proceeds to a twelfth step S32. In the twelfth step S32, a free game is initiated (and played). Any award as a result of the free game is paid to the player.

In a thirteenth step S34, if the free games feature is retriggered in the outcome of the free game, then the method M20 proceeds to a fourteenth step S36. In the fourteenth step S36, if the wheel spin feature was triggering in the outcome of the previous free game, then the method M20 returns to the second step S12.

Returning to the thirteenth step S34, if the free game feature was not retriggered then the method M20 proceeds to a fifteenth step S42. In the fifteenth step S42, the free game counter is decremented and if there are no remaining free games, then the method ends (sixteenth step S44). Otherwise, the method M20 returns to the twelfth step S32.

Returning to the fourteenth step S36, if the wheel spin feature was not retriggered, then the method M20 proceeds to a sixteenth step S40. In the sixteenth step S42, the additional free games are added to the free game counter and the method returned to the twelfth step S32.

In the primary game, if the free game feature is triggered, but the wheel feature is not triggered, then the method M20 is entered at a seventeenth step S38. Then the proceeds to step S40.

Alternative Embodiments

With reference to FIGS. 25A-25F, 26A, 26B and 27A-27E, a game having a game feature that utilize aspects of the present invention, as described above, and referred to as the Star Watch™, Star Watch Magna™, or Star Watch Fire™ game (the "Star Watch game"). The Star Watch game includes a primary game with a feature-area type game feature and a bonus game. As discussed in further detail below, the game feature of the Star Watch game includes (1) an award of a predetermined number of credits, (2) a number of free games or spins, and (3) a bonus game.

The primary game is a video slot game is a 3×5 video game, i.e., the cells 70 of the grid 68 are arranged in three rows and 5 columns. The symbols on the video reel strips 70-80 are selected from a symbol set that includes the following symbols: WILD, SCATTER, Pic-a, Pic-b, Pic-c, Pic-d, Pic-e, a plurality of Prize Symbols and a Prize-Wheel symbols. The Scatter symbol, the Prize Symbols and the Prize-Wheel symbols are predetermined symbols which if occur with a feature area (see above and below), a game feature is provided, as explained below.

In one embodiment, the symbol set includes a plurality of credit prize symbols. Each credit prize symbol has an associated number of credits. If a credit prize symbol appears in the feature area during the primary game and any free games or spins, then the associated credit amount is automatically awarded to the player.

Figure 25A:
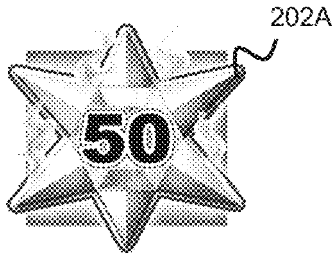
FIGS. 25A-25F are diagrammatic illustrations of symbols used in a game, according to an embodiment of the present invention.
Figure 25B:
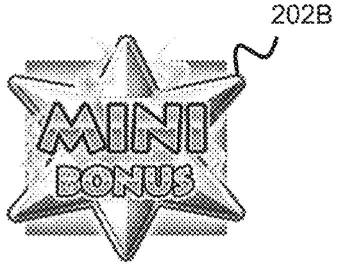
Figure 25C:
Figure 25D:
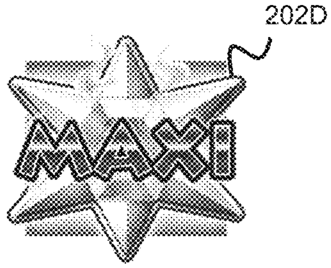
Figure 25E:
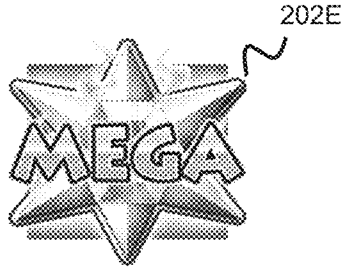

An exemplary credit prize symbol 202A having an associated credit amount of 50 credits is shown in FIG. 25A. In one embodiment, the symbol set will include credit prize symbols have associated credit amounts of 50, 100, 150, 200, 500, 750, 1,000 and 1,500. The plurality of credit prize symbols also includes a plurality of progressive prize symbols.

With reference to FIGS. 25B, 25C, 25D, 25E, in the illustrated embodiment, the plurality of credit prize symbols includes a mini bonus symbol 202B, a major bonus symbol 202C, a maxi bonus symbol 202D, and a mega bonus symbol 202E. Each of the bonus symbols 202B, 202C, 202D, 202E is associated with a bonus credit amount. The bonus credit amount associated with maxi and mega bonus symbols 202D, 202E are progressive bonus, i.e., the awards. The progressive credit amounts are awarded from a respective pool of credits are increments as a function of wagers made by a plurality of players. The bonus credit amounts associated with the mini and major bonus symbols 202B, 202C are funded by a progressive amount, but are fixed amount. The fixed amount may be determined as a function of the denomination of the game (which may be selected by the player).

As stated above, the credit prize symbols 202A, 202B, 202C, 202D, 202E, have an associated credit amount. During the primary game, if a credit prize symbol 202A, 202B, 202C, 202D, 202E, appears in the feature area then the associated credit amount is automatically awarded to the player. The resulting awarded credit amount awarded is in addition to any winning combination appearing on any player payline. With respect to the mega and maxi progressive awards, once the awards have been awarded, the respective credit amounts are reset to a predetermined reset value.

In addition, the game feature includes a "nudge" feature. In the illustrated embodiment, at least one of the reels includes a consecutive run of credit prize symbols. The nudge feature causes the consecutive run of the credit symbols nudges and occupies the column when only a part of the consecutive run of credit symbols appears in the outcome. The nudge feature is available only in the free spins. In a free spin, if one of the consecutive run of credit prize symbols partially appears in the feature area after the reel stops spinning, the reel additionally spins upward or downward so that the credit prize symbols occupy all of the cells 70 of the same column of the grid 64. Alternatively, the credit prize symbol appearing in the feature area might be copied into the cells of the same column. The nudge feature is performed only after any awards based on winning combinations in the outcome of the game and free games are awarded.

As discussed above, the SCATTER symbol may be a predetermined symbol. In the Star Watch game, if a predetermined number of SCATTER symbols appear in the outcome of a primary game or a feature game, then a predetermined number of free games or spins is awarded. In an alternative embodiment, the SCATTER symbols must appear in the feature area. The free spin game feature is available during the primary game and the free spins. In the illustrated embodiment, the appearance of 3, 4 or 5 SCATTER symbols results in 8, 12, and 20 free games, respectively being awarded.

Figure 25F:
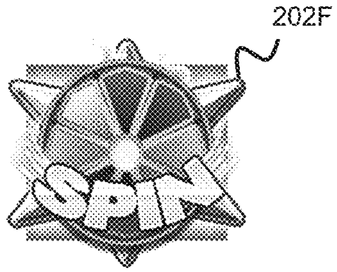
Figure 26A:
FIGS. 26A-26B are first and second diagrammatic illustrations of a display area of the gaming machine in FIG. 1, according to another embodiment of the present invention.
Figure 26B:

With respect to FIG. 25F, the set of symbols includes a prize-wheel symbol 202F. If the prize-wheel symbol 202F appears in the feature area, then a bonus game consisting of a spin of a wheel (see below) is awarded. In the illustrated embodiment, the player is awarded a number of spins of the wheel equal to the number of prize-wheel symbols 202F that appear in the feature area. The wheel includes a number of plates, each plate bearing an award. In the illustrated embodiment, awards are one of the mini, major, mega and maxi awards. During the bonus game, the wheel is rotated and then stopped. The wheel has an associated pointer that indicates one of the plates. The credit amount associated with the bonus award on the plate indicated by the pointer is awarded to the player.

Figure 27A:
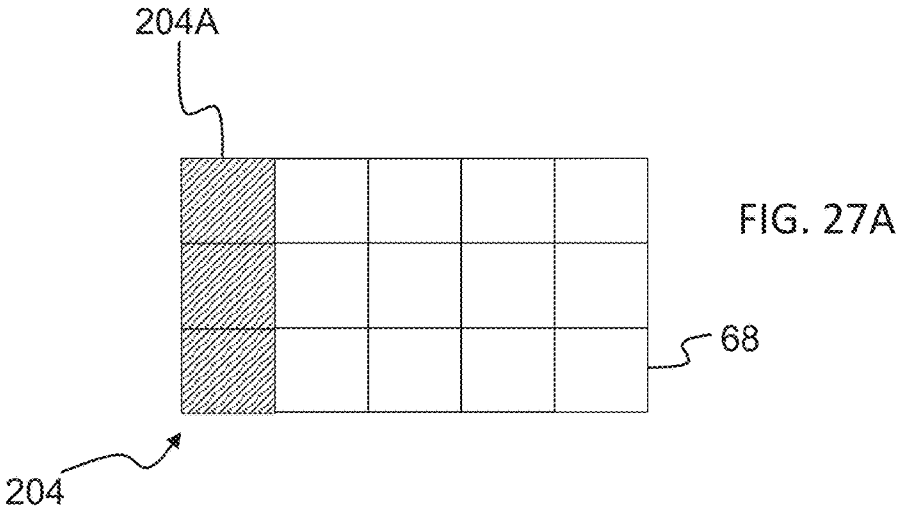
FIGS. 27A-27E and 28 are diagrammatic illustrations of a display area and/or operation unit of the gaming machine in FIG. 1, according to another embodiment of the present invention.
Figure 27B:
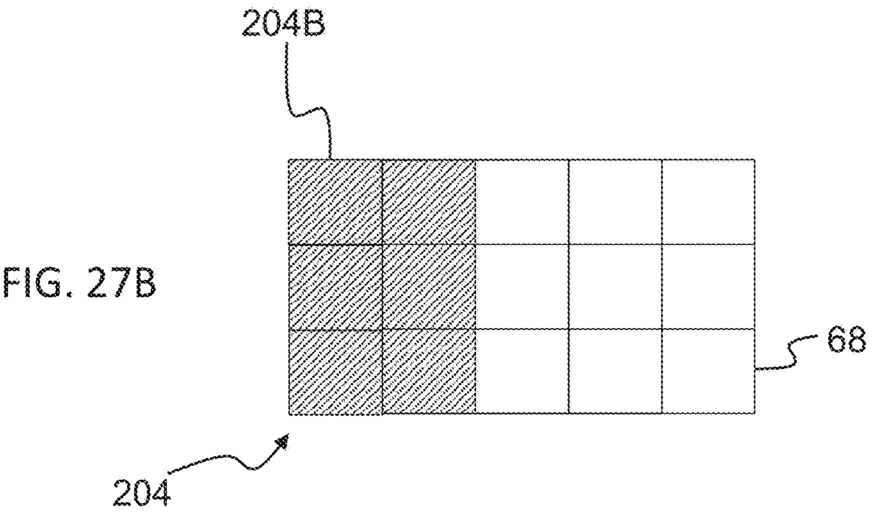
Figure 27C:
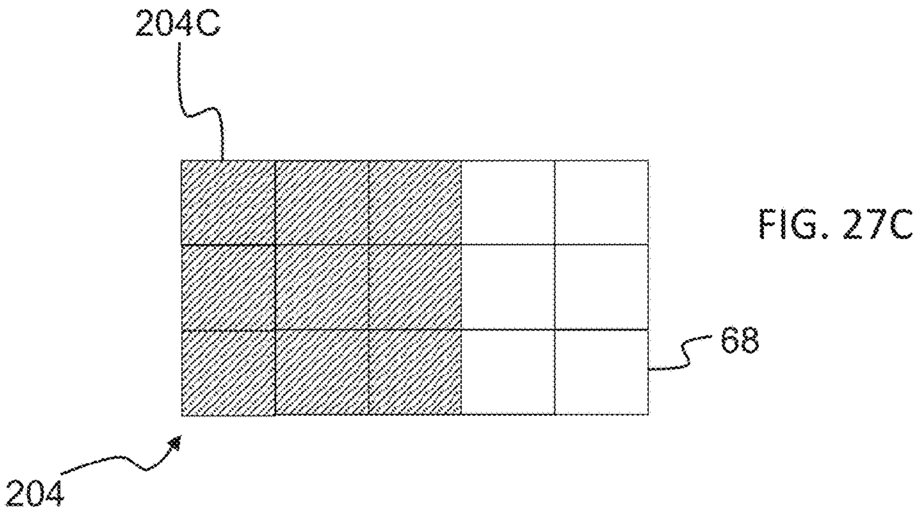
Figure 27D:
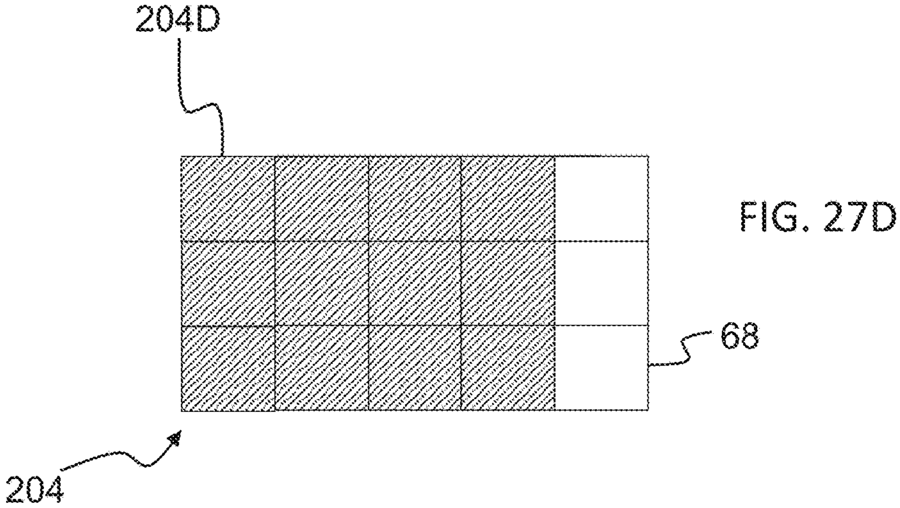
Figure 27E:
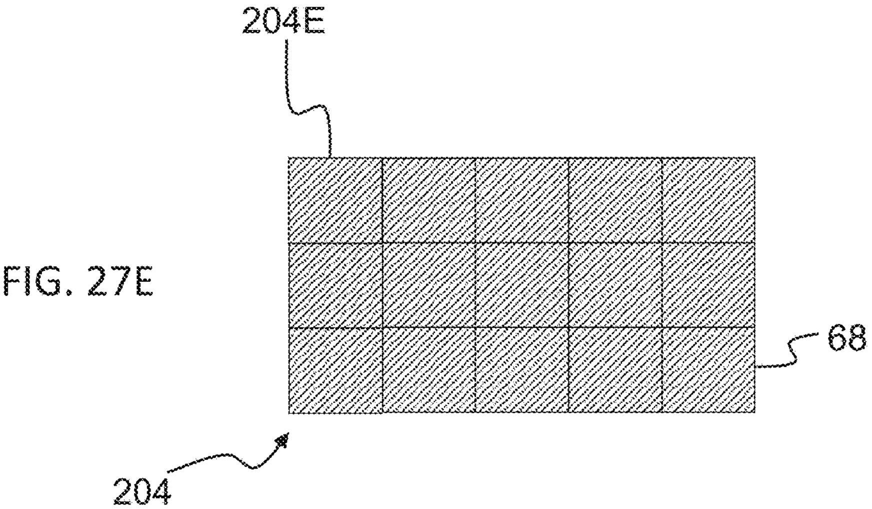
Figure 28:
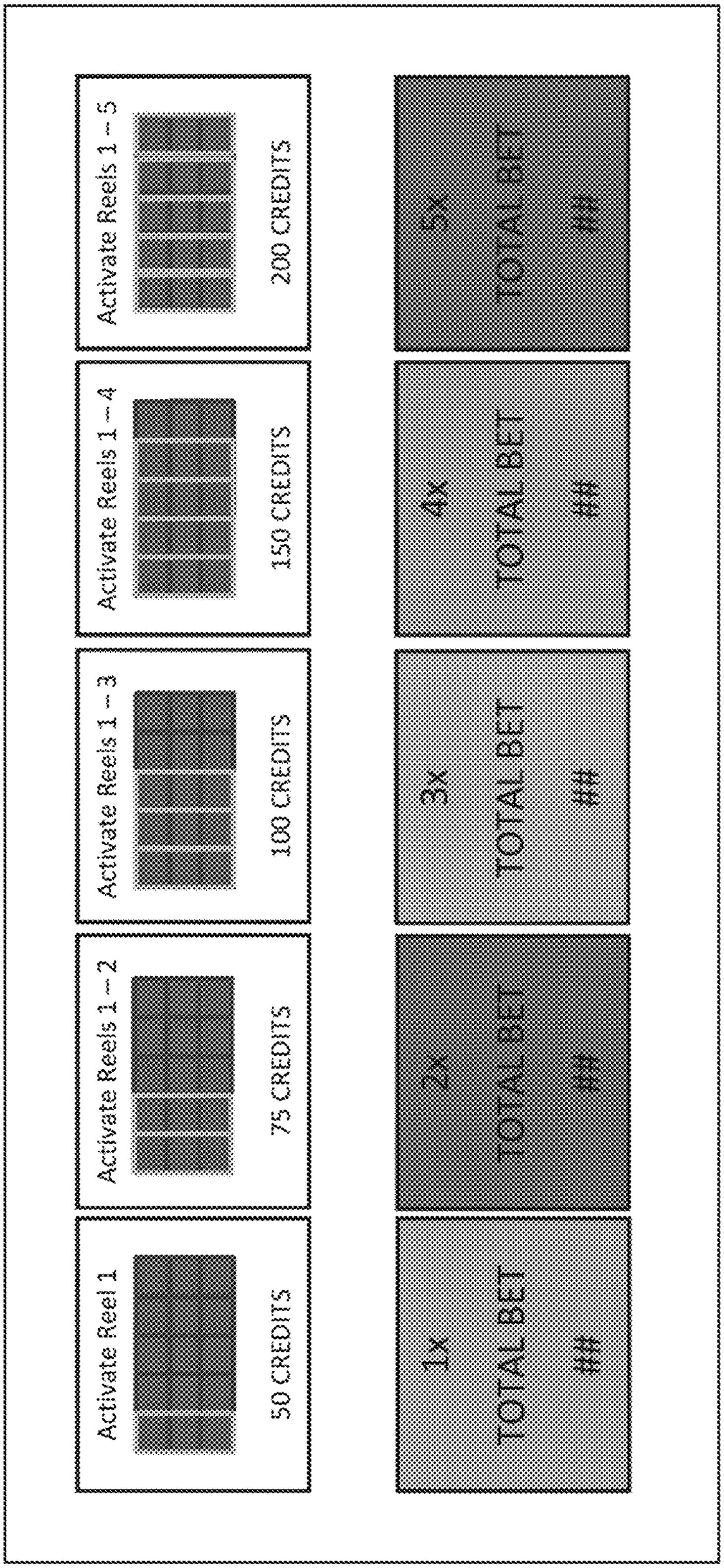

With particular reference to FIGS. 27A-27 EF, the feature area 204 utilized in the primary game and the free spins is selectable by the player. In the illustrated embodiment, the feature area 204 is based on the columns in the grid 68 and is selected from a set of potential feature areas:

- first feature area 204A, including the cells 70 of the first column of the grid 68,
- second feature area 204B, including the cells 70 of the first and second columns of the grid 68,
- third feature area 204B, including the cells 70 of the first, second and third columns of the grid 68,
- fourth feature area 204B, including the cells 70 of the first, second, third and fourth columns of the grid 68, and
- fifth feature area 204B, including the cells 70 of the first, second, third, fourth and fifth columns of the grid 68, In the illustrated embodiment, the number of paylines played (25) is fixed. With reference to FIG. 28, the player is presented with a number of wager options with player selectable buttons. The options may be presented on the display area 78 or using the operation unit 32. In one embodiment, the operation unit 32 includes a number of digital buttons, which may be either mechanical buttons with built-in displays or are implemented using a touchscreen display panel. Alternatively, or in addition, the buttons may be implemented on the display unit 28 using a touchscreen input device. In the top row of buttons, a button corresponding to each of the potential feature areas 204A, 204B, 204C, 204D, 204E is provided. An associated base wager (50, 75, 100, 150, 200 credits, respectively) is also displayed. The player activates one of the potential features areas 204A, 204B, 204C, 204D, 204E by selecting the corresponding button. The default or initial feature area includes the first reel or column having a base wager of 50 credits. The player may then select a bet multiplier (1×, 2×, 3×, 4×, 5×). The player's actual wager or bet will be equal to the base wager based on the selected feature area multiplied by the bet multiplier. After the player is satisfied with the wager, the game may be initiated.

INDUSTRIAL APPLICABILITY

In the illustrated embodiments, the processor 38 initiates an instance of the primary game 202. In one embodiment, during the primary game 202, the processor 38 randomly determines an outcome of an instance of the primary game 202 and spins the virtual reel strips 72 to 80 and sequentially stops the virtual reel strips 72 to 80 to display the randomly generated outcome including a game symbol being displayed in each cell 70 of the grid 68. For example, in one embodiment, the processor 38 may execute algorithms, e.g., M10 or M20, including receiving a signal indicating the player depressing the spin button and start spinning each virtual reel strip 72 to 80, obtain random numbers from the random number generator, and determine a stop position of each virtual reel strip 72 to 80 based on the random numbers and the stop position data file 28. In one embodiment, the processor may obtain a random number for each simulate virtual reel strip 72 to 80, i.e. five random numbers. The processor 38 then established a reel stop counter, "i", and sets the reel stop counter, i, equal to x. The processor 38 then identifies the $i^{th}$ virtual reel strip associated with the stop counter, i, and stops the identified virtual reel strip to display the corresponding symbols in the corresponding cells 70 associated with the identified virtual reel strip. The processor then increments the reel stop counter, i, by x, i.e. i=i+x, and repeats the process of identifying the virtual reel strip associated with the incremented reel stop counter and stopping the identified virtual reel strip. This process continues until each virtual reel strip has been stopped. In this embodiment, for example, the virtual reel strips are numbered 1-5. In one embodiment, during the reel spin, the player may initiate the stopping of the reels by depressing the spin button, which enables the player to accelerate game play.

In one embodiment, upon receiving a signal indicating the player depressing the spin button, the processor may generate each virtual reel strip 72 to 80 for use during the instance of the primary game 202. For example, in one embodiment, the processor 38 may execute the game application program 92 using the reel layout table 132 for use in generating each virtual reel 72 to 80. The processor 38 may access the reel layout table 132 and identify a reel designation 260 and stop position 262 associated with the virtual reel being generated, and access each sequential symbol position logic cell 264 for generating and displaying the corresponding game symbols. The processor 38 then generates the corresponding virtual reel strip based on the instructions associated with each sequential symbol position logic cell 264, associated with the reel designation 260. In addition, the processor 38 accesses the inner symbol table 138 to randomly select a symbol that is populated in symbol position designating a varying symbol ("inn"). Each "inn" logic cell is transformed into PicA, PicB, PicC, PicD, PicE, A, K, Q, J, 10 or 9 in each game, such that each "inn" logic cell is populated with the same symbol.

Upon stopping the virtual reel strips 72 to 80, the processor 38 determines if any winning combination of symbols is displayed in the outcome if the instance of the primary game 202, and determines an initial award associated with the winning outcome. In one embodiment, the processor 38 detects an appearance of a winning combination of game symbols in the outcome based on the played paylines and provides an initial award based on the winning combination of symbols and a paytable.

In such embodiments, a gaming machine 10 providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

In the embodiment, determining the stop position of each reel is described as consecutively acquiring a random number that is used respectively, but the acquisition procedure of the random number is not limited to this. For example, when the game starts, the control unit 22 acquires these random numbers in a batch, and each random number may be stored in the storage area of the non-erasing memory 42 or the storage 44 when power failure occurs. In this type of situation, even when a power failure and the like occurs during a game, because the control unit 22 acquired the random number from the memory 42 or the storage 44 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 42 or the storage 44, such great dissatisfaction can be avoided for the player because the progress of a game similar to before a power failure occurred can be reproduced after recovering from a power failure.

In another embodiment, the player may initiate a game through actuation of a spin button (or other button). After initiation of the game, the control unit 22 randomly determines the step position of all reels. The control unit 22 may perform the check for the trigger condition before the reels stop spinning, and thus has already determined the outcome of the game. However, the control unit 22 displays the outcome of the game in a step by step process as discussed above.

Further, in the embodiment, a bill/ticket is displayed as game value, and received by these bill/ticket identification devices, and a form where a ticket is output by a printer device 30 is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strips from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a cabinet;

a display device mounted to the cabinet and configured to display an animated transitional sequence of computer-generated icons on a display screen of the display device; and a control unit operably coupled to the display device, the control unit including one or more processors programmed to execute an algorithm to display the animated transitional sequence of computer-generated icons on the display screen including the steps of:

displaying the display screen on the display device including a plurality of reels;

establishing a plurality of predefined subsets of reels, each of the plurality of predefined subsets of reels being associated with a different wager amount, the plurality of predefined subsets of the reels including a first subset of reels including a first number of reels and a second subset of reels including a second number of reels that is greater than the first number of reels, wherein a wager amount associated with the second subset of reels is greater than a wager amount associated with the first subset of reels;

displaying a plurality of player selectable feature area buttons on the display device, each player selectable feature area associated with a corresponding subset of reels;

receiving a player's selection of a selected player selectable feature area button and highlighting a feature area including the corresponding subset of reels associated with the selected player selectable feature area button;

animating the plurality of reels to spin and stop to display a plurality of symbols in the grid; and displaying a game feature upon detecting the occurrence of a predetermined symbol appearing in the highlighted feature area with the reels stopped by rendering a prize-wheel having a substantially conical shape on the display screen and animating the prize-wheel to spin and stop to indicate a bonus prize award.

2. The gaming machine of claim 1, wherein the one or more processors is programmed to execute the algorithm including the steps of:

displaying the display screen including five reels;

establishing the first subset of reels to include a single reel; and establishing the second subset of reels to include two adjacent reels including the single reel.

3. The gaming machine of claim 2, wherein the one or more processors is programmed to execute the algorithm including the steps of:

establishing the first subset of reels to include a left-most reel as the single reel.

4. The gaming machine of claim 3, wherein the one or more processors is programmed to execute the algorithm including the steps of:

establishing a third subset of reels to include three adjacent reels including the left-most reel;

establishing a fourth subset of reels to include four adjacent reels including the left-most reel; and establishing a fifth subset of reels to include five adjacent reels including the left-most reel.

5. The gaming machine of claim 1, wherein the one or more processors is programmed to execute the algorithm including the steps of:

rendering the prize-wheel including a plurality of plates displaying a plurality of awards.

6. The gaming machine of claim 5, wherein the one or more processors is programmed to execute the algorithm including the steps of:

displaying the prize-wheel including the plurality of plates displaying the plurality of awards including credit, mini, major, mega and maxi awards.

7. The gaming machine of claim 1, wherein the one or more processors is programmed to execute the algorithm including the steps of:

rendering the game feature if a prize-wheel symbol appears in the highlighted feature area with the reels stopped.

8. A handheld mobile computing device comprising:

a touchscreen display device configured to display an animated transitional sequence of computer-generated icons on a display screen of the touchscreen display device; and one or more processors coupled to the touchscreen display device and programmed to execute an algorithm to display the animated transitional sequence of computer-generated icons on the display screen including the steps of:

displaying the display screen on the touchscreen display device including a plurality of reels; and establishing a plurality of predefined subsets of reels, each of the plurality of predefined subsets of reels being associated with a different wager amount, the plurality of predefined subsets of the reels including a first subset of reels including a first number of reels and a second subset of reels including a second number of reels that is greater than the first number of reels, wherein a wager amount associated with the second subset of reels is greater than a wager amount associated with the first subset of reels;

displaying a plurality of player selectable feature area buttons on the touchscreen display device, each player selectable feature area associated with a corresponding subset of reels;

receiving a player's selection of a selected player selectable feature area button and highlighting a feature area including the corresponding subset of reels associated with the selected player selectable feature area button;

animating the plurality of reels to spin and stop to display a plurality of symbols in the grid; and displaying a game feature upon detecting the occurrence of a predetermined symbol appearing in the highlighted feature area with the reels stopped by rendering a prize-wheel having a substantially conical shape on the display screen and animating the prize-wheel to spin and stop to indicate a bonus prize award.

9. The handheld mobile computing device of claim 8, wherein the one or more processors is programmed to execute the algorithm including the steps of:

displaying the game screen including five reels;

establishing the first subset of reels to include a single reel; and establishing the second subset of reels to include two adjacent reels including the single reel.

10. The handheld mobile computing device of claim 9, wherein the one or more processors is programmed to execute the algorithm including the steps of:

establishing the first subset of reels to include a left-most reel as the single reel.

11. The handheld mobile computing device of claim 10, wherein the one or more processors is programmed to execute the algorithm including the steps of:

establishing a third subset of reels to include three adjacent reels including the left-most reel;

establishing a fourth subset of reels to include four adjacent reels including the left-most reel; and establishing a fifth subset of reels to include five adjacent reels including the left-most reel.

12. The handheld mobile computing device of claim 11, wherein the one or more processors is programmed to execute the algorithm including the steps of:

rendering the prize-wheel including a plurality of plates displaying a plurality of awards.

13. The handheld mobile computing device of claim 12, wherein the one or more processors is programmed to execute the algorithm including the steps of:

displaying the prize-wheel including the plurality of plates displaying the plurality of awards including credit, mini, major, mega and maxi awards.

14. The handheld mobile computing device of claim 8, wherein the one or more processors is programmed to execute the algorithm including the steps of:

rendering the game feature if a prize-wheel symbol appears in the highlighted feature area with the reels stopped.

15. A non-transitory computer-readable storage media having computer-executable instructions embodied thereon, when executed by one or more processors the computer-executable instructions cause the one or more processors to perform an algorithm to display an animated transitional sequence of computer-generated icons on a display screen of a display device including the steps of:

displaying the display screen on the display device including a plurality of reels;

establishing a plurality of predefined subsets of reels, each of the plurality of predefined subsets of reels being associated with a different wager amount, the plurality of predefined subsets of the reels including a first subset of reels including a first number of reels and a second subset of reels including a second number of reels that is greater than the first number of reels, wherein a wager amount associated with the second subset of reels is greater than a wager amount associated with the first subset of reels;

displaying a plurality of player selectable feature area buttons on the display device, each player selectable feature area associated with a corresponding subset of reels;

receiving a player's selection of a selected player selectable feature area button and highlighting a feature area including the corresponding subset of reels associated with the selected player selectable feature area button;

animating the plurality of reels to spin and stop to display a plurality of symbols in the grid; and displaying a game feature upon detecting the occurrence of a predetermined symbol appearing in the highlighted feature area with the reels stopped by rendering a prize-wheel having a substantially conical shape on the display screen and animating the prize-wheel to spin and stop to indicate a bonus prize award.

16. The non-transitory computer-readable storage media of claim 15, wherein the computer-executable instructions cause the one or more processors to perform the algorithm including the steps of:

displaying the display screen including five reels;

establishing the first subset of reels to include a single reel; and establishing the second subset of reels to include two adjacent reels including the single reel.

17. The non-transitory computer-readable storage media of claim 16, wherein the computer-executable instructions cause the one or more processors to perform the algorithm including the steps of:

establishing the first subset of reels to include a left-most reel as the single reel.

18. The non-transitory computer-readable storage media of claim 17, wherein the computer-executable instructions cause the one or more processors to perform the algorithm including the steps of:

establishing a third subset of reels to include three adjacent reels including the left-most reel;

establishing a fourth subset of reels to include four adjacent reels including the left-most reel; and establishing a fifth subset of reels to include five adjacent reels including the left-most reel.

19. The non-transitory computer-readable storage media of claim 15, wherein the computer-executable instructions cause the one or more processors to perform the algorithm including the steps of:

rendering the prize-wheel including a plurality of plates displaying a plurality of awards.

20. The non-transitory computer-readable storage media of claim 15, wherein the computer-executable instructions cause the one or more processors to perform the algorithm including the steps of:

rendering the prize-wheel including the plurality of plates displaying the plurality of awards including credit, mini, major, mega and maxi awards.

* * * * *